(12) United States Patent
Fang et al.

(10) Patent No.: US 12,240,036 B2
(45) Date of Patent: *Mar. 4, 2025

(54) MnAl ALLOY, PARTICLES THEREOF, AND METHOD FOR PRODUCTION

(71) Applicant: Höganäs AB (Publ), Höganäs (SE)

(72) Inventors: Hailiang Fang, Uppsala (SE); Martin Häggblad Sahlberg, Uppsala (SE); Björn Skårman, Höganäs (SE)

(73) Assignee: Höganäs AB (Publ), Höganäs (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,038

(22) Filed: Feb. 3, 2023

(65) Prior Publication Data

US 2023/0249248 A1 Aug. 10, 2023

Related U.S. Application Data

(62) Division of application No. 16/644,397, filed as application No. PCT/EP2018/073595 on Sep. 3, 2018, now Pat. No. 11,738,389.

(30) Foreign Application Priority Data

Sep. 4, 2017 (EP) .................... 17189240

(51) Int. Cl.
*B22F 1/05* (2022.01)
*B22F 1/142* (2022.01)
(Continued)

(52) U.S. Cl.
CPC ............... *B22F 1/05* (2022.01); *B22F 1/142* (2022.01); *B22F 9/08* (2013.01); *C22C 1/045* (2013.01);
(Continued)

(58) Field of Classification Search
CPC ......... C22C 1/045; C22C 22/00; C22C 1/047; B22F 2301/20; B22F 1/05; B22F 2304/10
See application file for complete search history.

(56) References Cited

U.S. PATENT DOCUMENTS

| 3,944,445 A | 3/1976 | Ohtani et al. |
| 11,738,389 B2 * | 8/2023 | Fang .................. B22F 1/05 |
| | | 420/434 |

(Continued)

FOREIGN PATENT DOCUMENTS

| CN | 105734374 A | 7/2016 |
| JP | S3912223 B | 7/1965 |

(Continued)

OTHER PUBLICATIONS

H. Fang et al., Structural, Microstructural, and Magnetic Evolution in Cryo Milled Carbon Doped MnAl, Jun. 2, 2018, Scientific Reports, 8, 2525(2018) (Year: 2018).*

(Continued)

*Primary Examiner* — Anthony M Liang
*Assistant Examiner* — Jacob J Gusewelle
(74) *Attorney, Agent, or Firm* — Boone IP Law

(57) ABSTRACT

An alloy represented by the formula $(Mn_xAl_y)C_z$, the alloy being aluminum (Al), manganese (Mn), and carbon (C), and optionally unavoidable impurities; wherein x=56.0 to 59.0 y=41.0 to 44.0 x+y=100, and z=1.5 to 2.4. The alloy is highly suitable for forming the ε and τ phase in high purity and high microstructural homogeneity. A method for processing an alloy of formula $(Mn_{x'}Al_{y'})C_{z'}$, wherein x'=52.0 to 59.0, y'=41.0 to 48.0, x'+y'=100, and z'=0.1 to 3.0, the process including providing the raw materials of the alloy, melting the raw materials, and forming particles of the alloy by gas atomization of the molten alloy.

20 Claims, 17 Drawing Sheets

(51) Int. Cl.
    *B22F 9/08*    (2006.01)
    *C22C 1/04*    (2023.01)
    *C22C 22/00*   (2006.01)
(52) U.S. Cl.
    CPC .......... *C22C 22/00* (2013.01); *B22F 2301/20* (2013.01); *B22F 2304/10* (2013.01)

(56) References Cited

U.S. PATENT DOCUMENTS

| | | |
|---|---|---|
| 2007/0220772 A1 | 9/2007 | Kato et al. |
| 2010/0218858 A1 | 9/2010 | Baker et al. |
| 2012/0003114 A1 | 1/2012 | Baker et al. |
| 2016/0307677 A1* | 10/2016 | Baker .................. B22F 3/20 |
| 2021/0062305 A1 | 3/2021 | Fang et al. |
| 2022/0165463 A1 | 5/2022 | Vidarsson et al. |

FOREIGN PATENT DOCUMENTS

| | | | |
|---|---|---|---|
| JP | S5067213 A | 6/1975 | |
| JP | S56147412 A | 11/1981 | |
| JP | 2002356703 A | 12/2002 | |
| WO | WO-2008048277 A2 * | 4/2008 | .......... C22C 1/0491 |
| WO | 2008048277 A3 | 8/2008 | |

OTHER PUBLICATIONS

International Search Report (PCT/ISA/210) issued on Oct. 8, 2018, by the European Patent Office as the International Searching Authority for International Application No. PCT/EP2018/073595.
Office Action (Notice of Reasons for Refusal) issued on Oct. 14, 2022, by the Japanese Patent Office in corresponding Japanese Patent Application No. 2020-512792, and an English Translation of the Office Action. (20 pages).
Ogheneyunume et al., "Effect of Ambient Aging on Heat-Treated Mechanically Alloyed Mn—Al—C Powders", IEEE Transactions on Magnetics, vol. 49, No. 7, pp. 3372-3374, Jul. 1, 2013. XP011519975.
V. T. et al., "Neutron Diffraction Study of the [tau]-Phase of Carbon-Doped Mn—Al Alloy", Physica Status Sou Di (A). Applied Research, vol. 159, No. 2, Feb. 1, 1997, pp. 323-326. XP055460019.
Written Opinion (PCT/ISA/237) issued on Oct. 8, 2018, by the European Patent Office as the International Searching Authority for International Application No. PCT/EP2018/073595.
Zeng, et al., "Structural and magnetic properties of nanostructured Mn—Al—C magnetic materials", Journal of Magnetism and Magnetic Mater, Elsevier, vol. 308, No. 2, pp. 214-226, Jan. 1, 2007. XP005708070.
Wyslocki, et al., "Magnetic Domain Structure of Isotropic MnAlC Permanent Magnet Alloys", Journal of Materials Science, vol. 19, 1983, pp. 1261-1266.
Office Action (Request for the Submission of an Opinion) issued on Mar. 16, 2023, by the Intellectual Property Office in corresponding Korean Patent Application No. 10-2020-7009489, and an English Translation of the Office Action. (11 pages).

* cited by examiner

FIGURE 1: PHASE DIAGRAM

FIGURE 2: RELATIONSHIP BETWEEN THEORETICAL MAGNETIC MOMENT AND MANGANESE CONTENT

FIGURE 3a-f: XRD and NPD patterns before flash heating

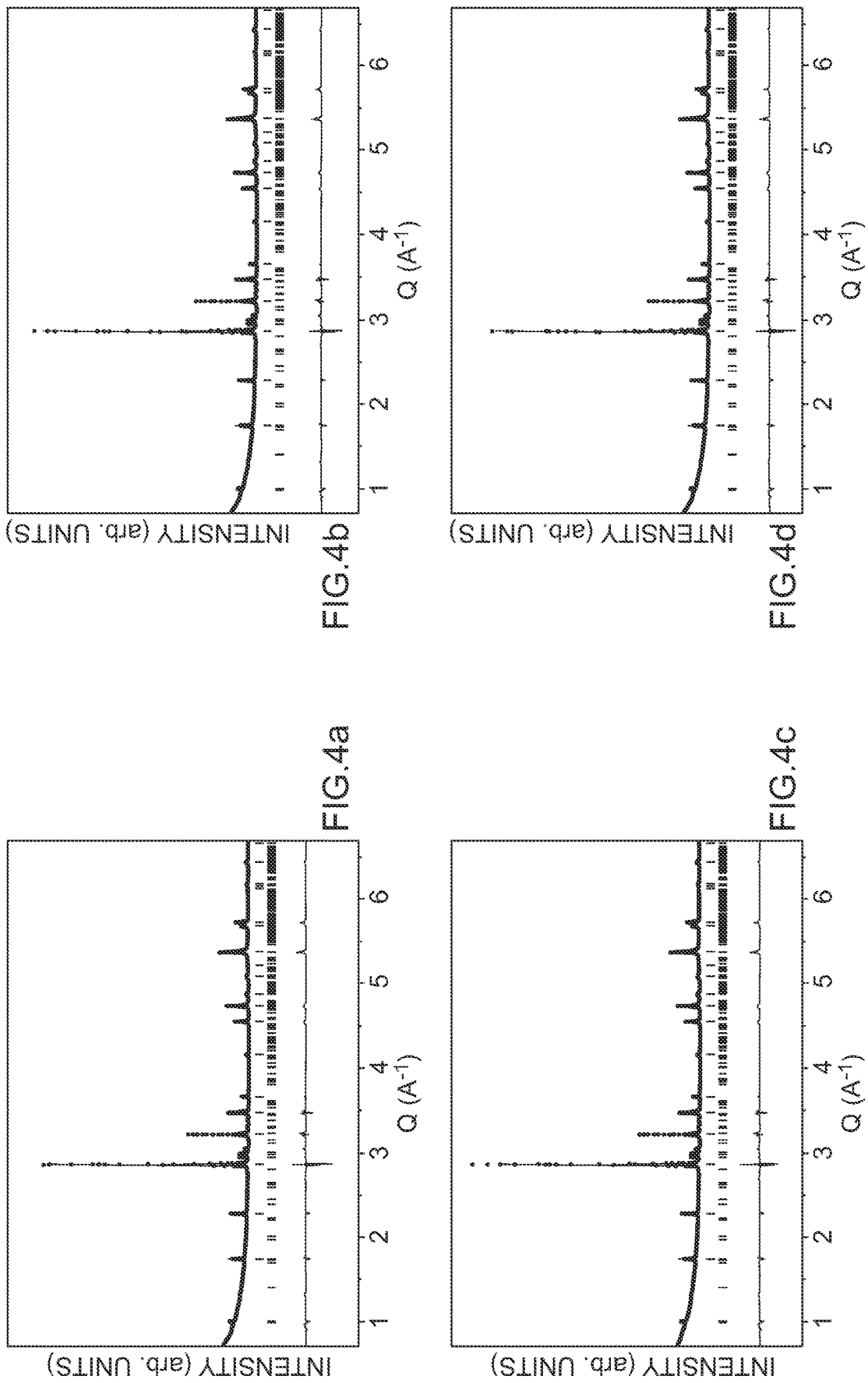

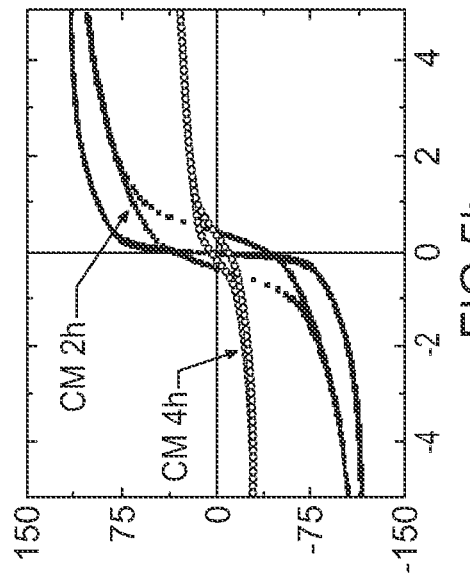
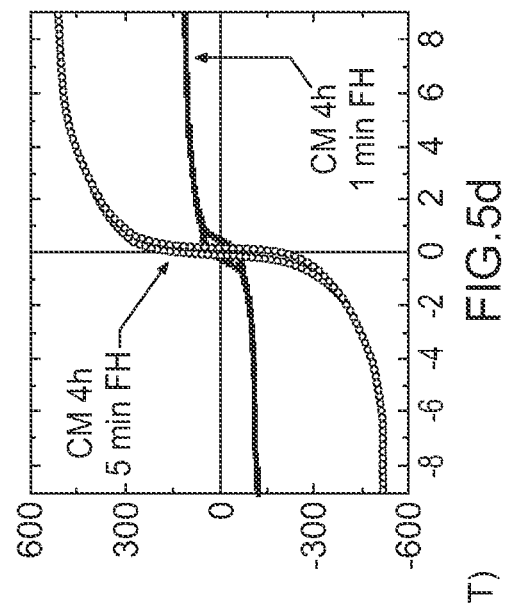
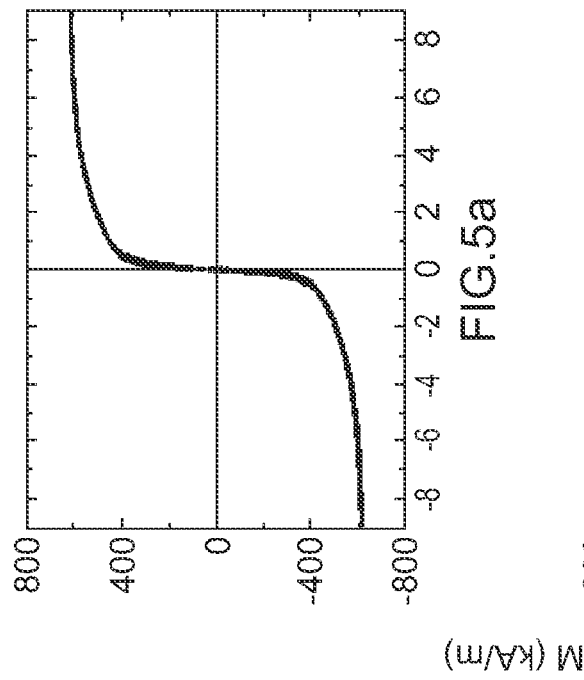
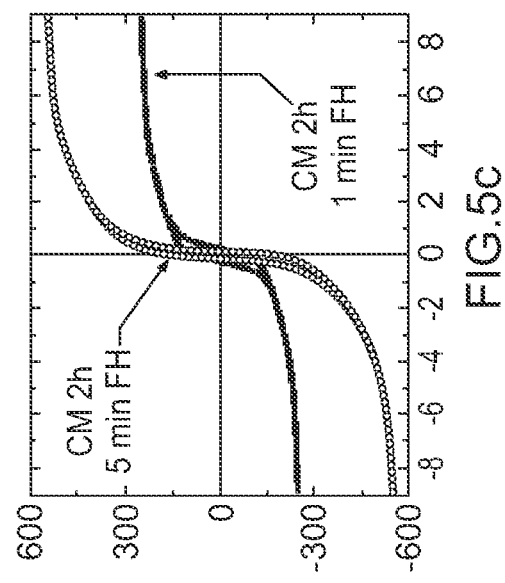
FIGURES 5a-d: Magnetization vs. magnetic field for the samples of Example 1

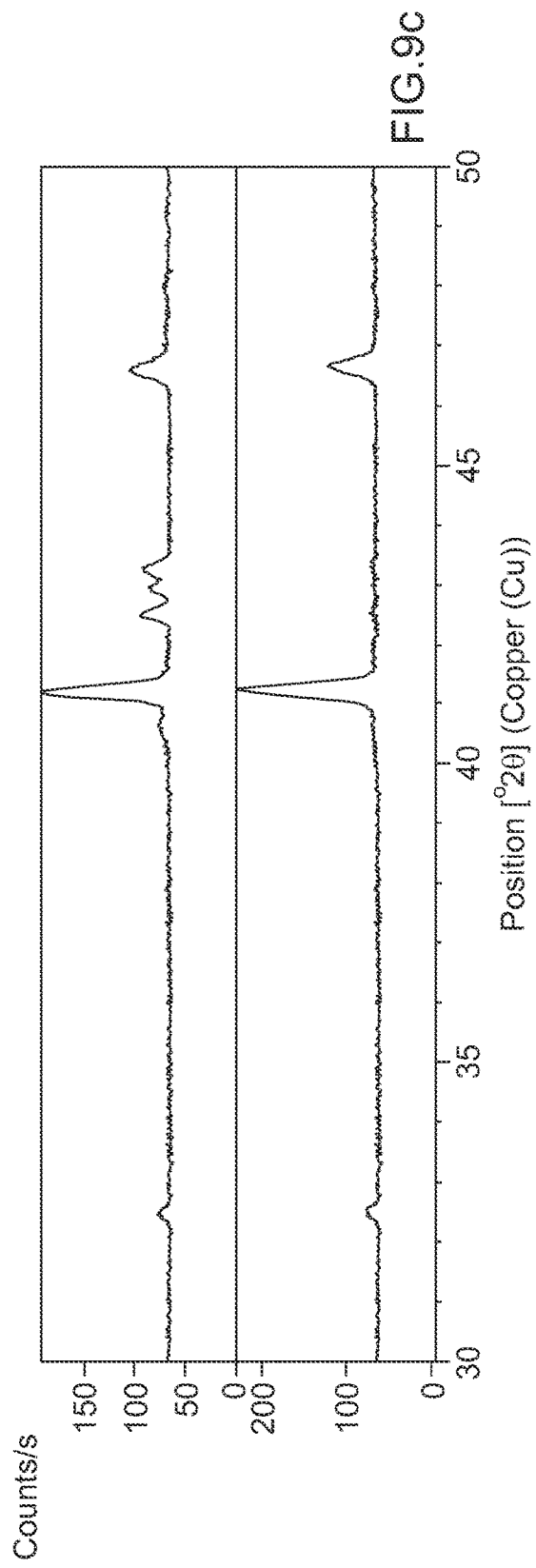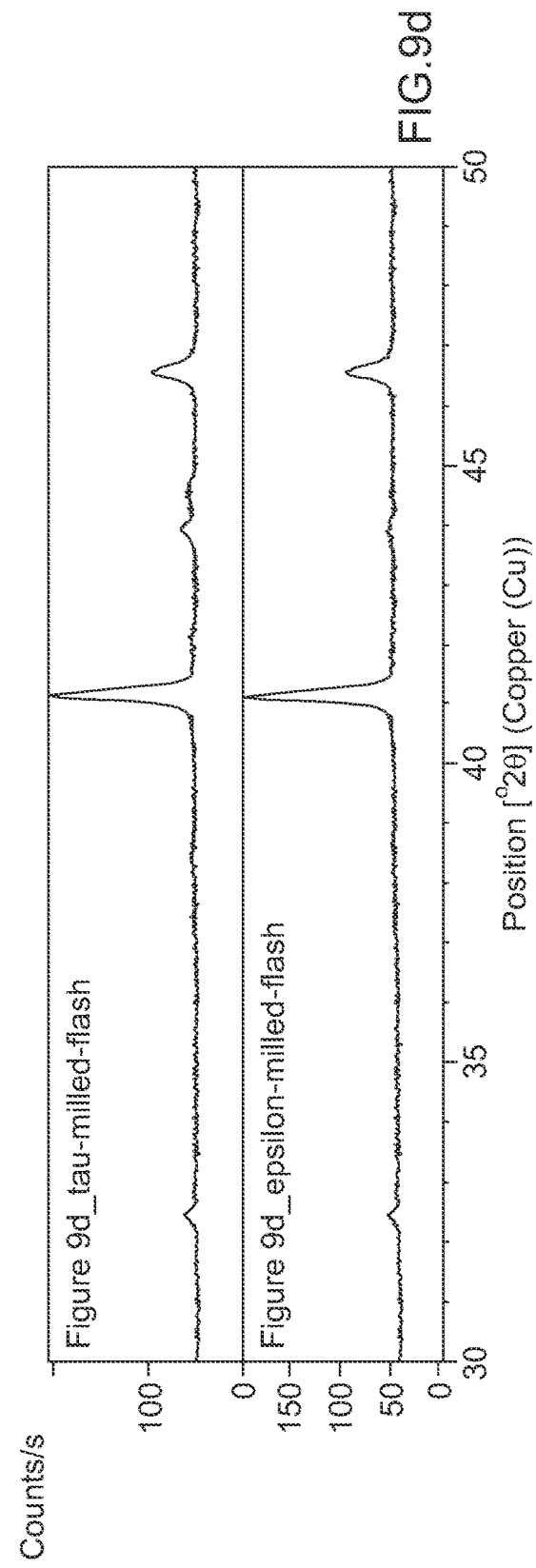

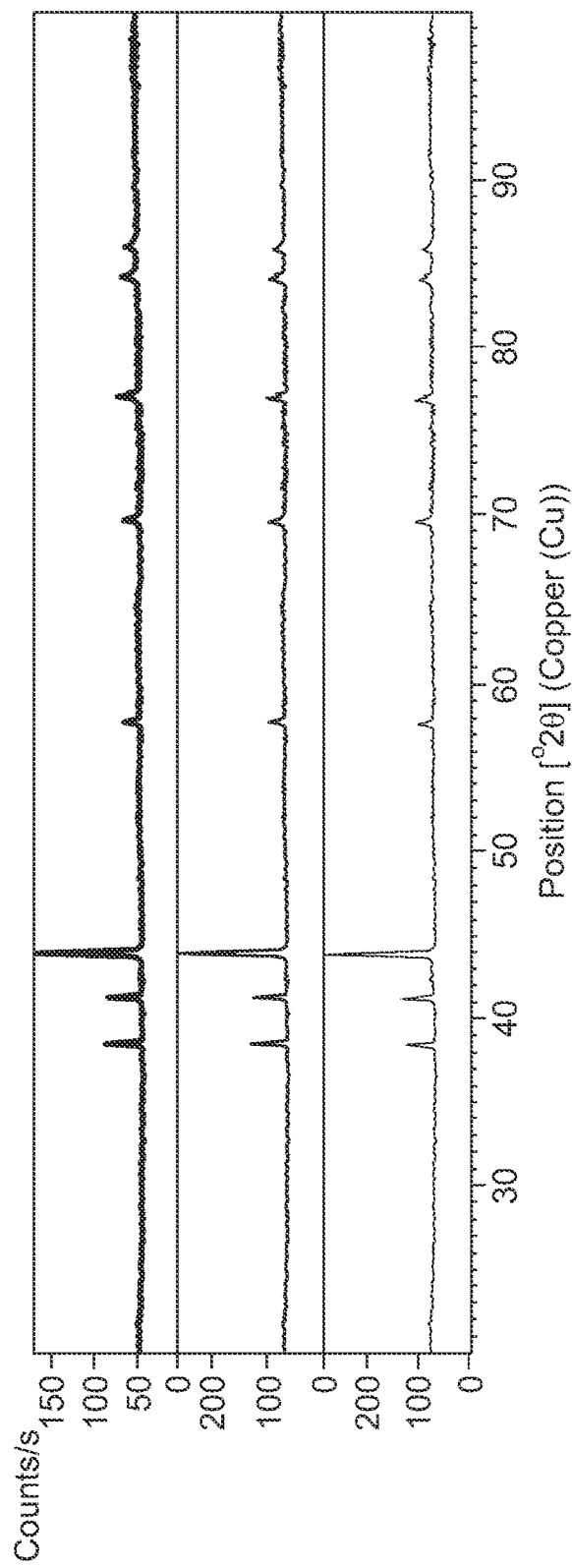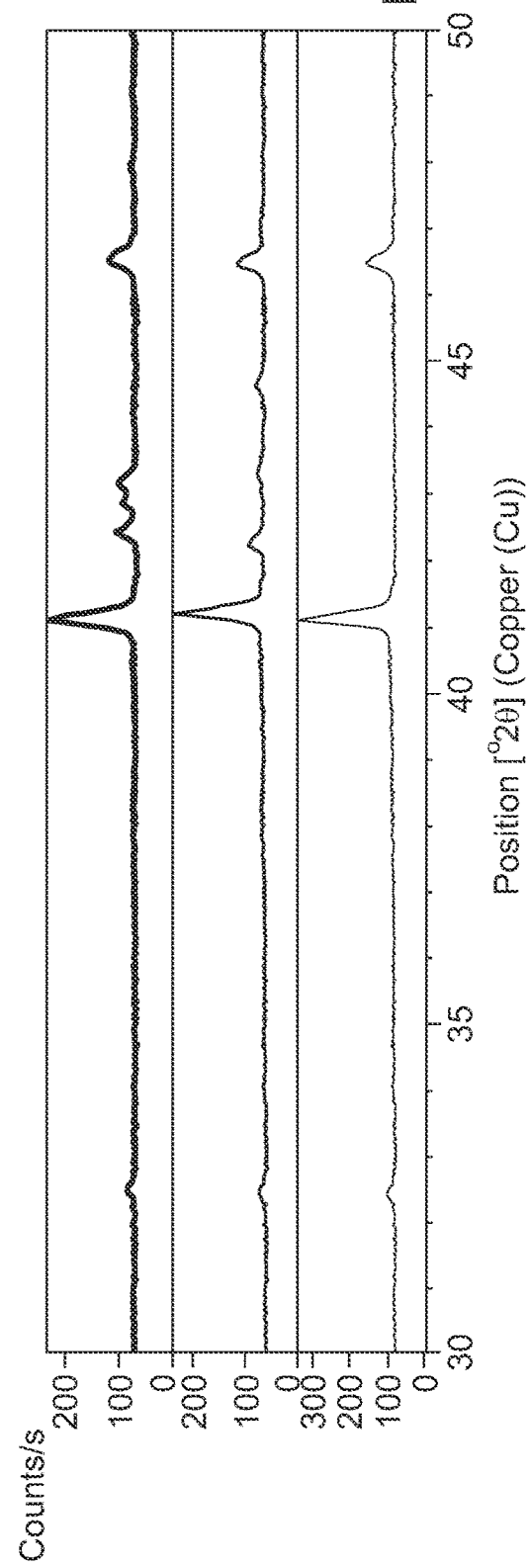

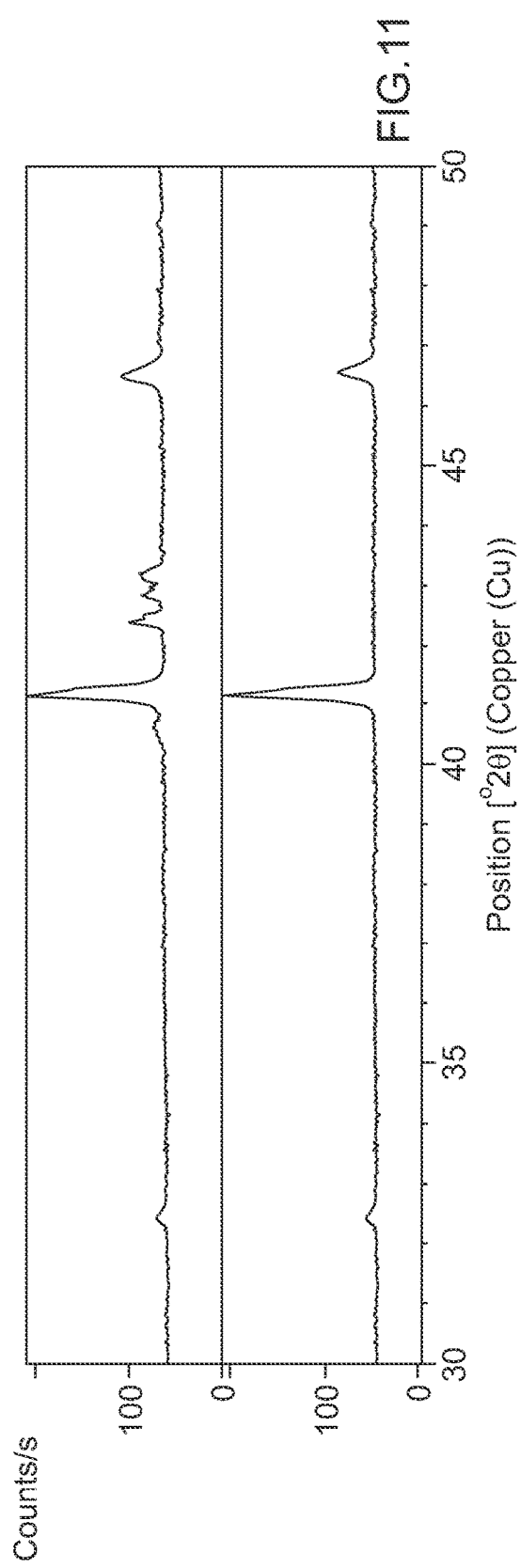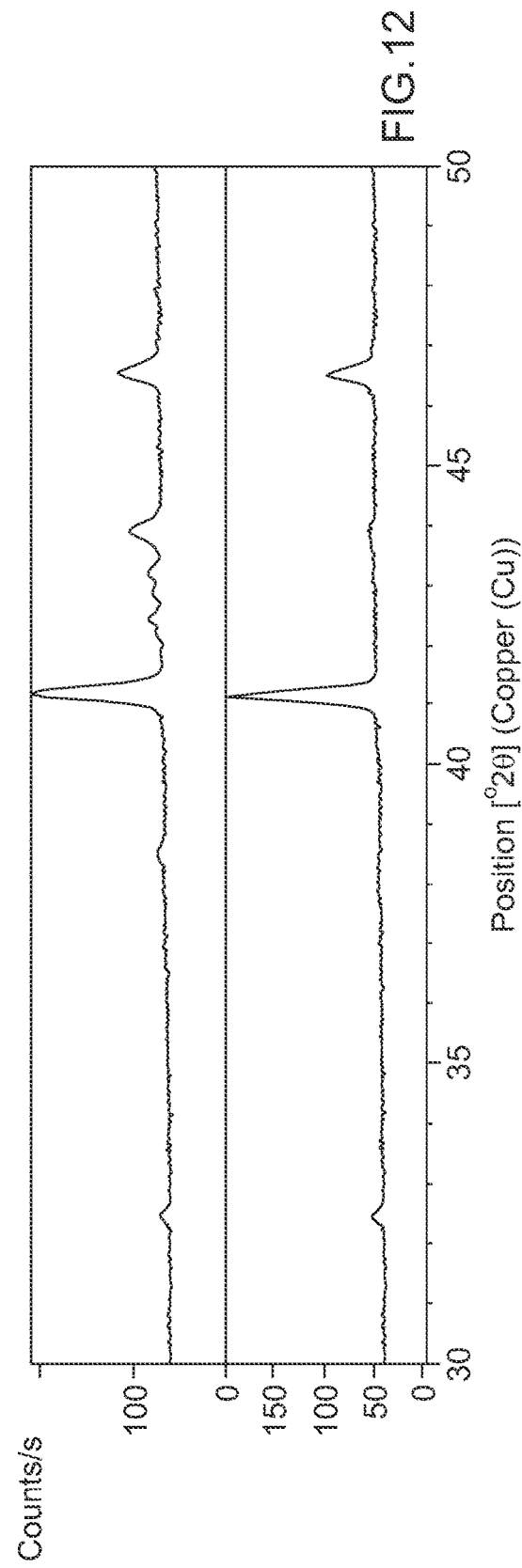

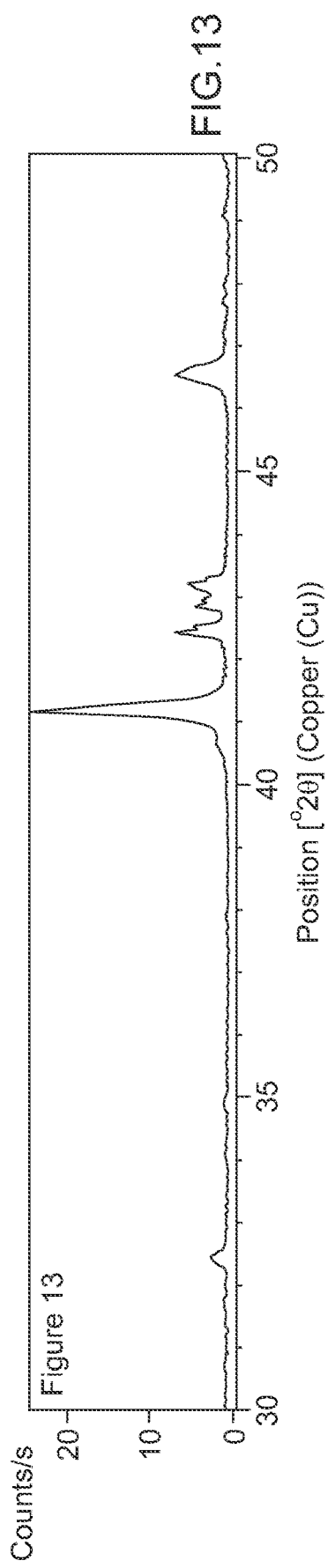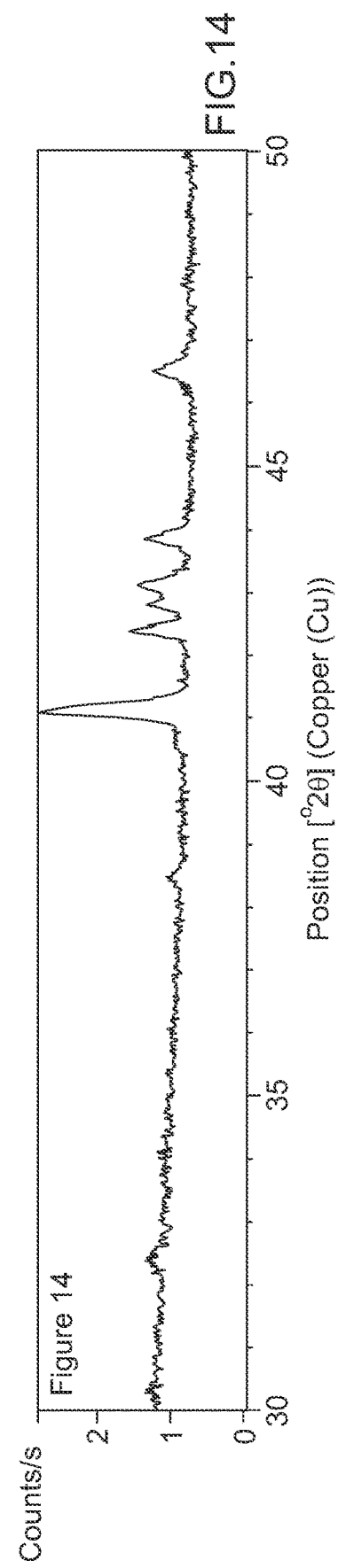

MnAl ALLOY, PARTICLES THEREOF, AND METHOD FOR PRODUCTION

CROSS REFERENCE TO RELATED APPLICATIONS

The present application is a continuation of U.S. application Ser. No. 16/644,397, filed on Mar. 4, 2020, which is a U.S. national stage of International Application No. PCT/EP2018/073595, filed on Sep. 3, 2018, which claims the benefit of European Application No. 17189240.9, filed on Sep. 4, 2017. The entire contents of each of U.S. application Ser. No. 16/644,397, International Application No. PCT/EP2018/073595, and European Application No. 17189240.9 are hereby incorporated herein by reference in their entirety.

TECHNICAL FIELD

In the most general terms, the present invention relates to improvements in manganese-aluminum (MnAl) alloys present in the τ phase or ε phase, and methods for obtaining MnAl alloys having improved properties, such as improved magnetic properties or improved purity.

In one aspect, the present invention relates to manganese-aluminum (MnAl) alloys that have a high content of τ phase or ε phase, and methods for their production.

In one aspect, the present invention relates to MnAl alloys having a high content of τ phase and improved magnetic properties, and methods for their production.

In another aspect, the present invention relates to methods for preparing MnAl alloys, and to methods for producing MnAl alloys, comprising the ε phase in high purity.

In yet another aspect, the invention relates to methods for converting the ε phase of MnAl alloys into the τ phase, and to alloys obtainable or obtained thereby.

BACKGROUND

Magnetic materials are used in many industrial applications and devices, such as speaker systems, earphones, direct current electric motors in battery (primary or secondary cell) powered devices, wind generators etc., just to mention a few.

Such magnetic materials are however expensive, and furthermore generally use rare earth metals. Accordingly, these conventional materials lead to both high costs and high environmental burden. There is thus a desire for a replacement of these rare earth metal based magnetic materials.

The low cost, rare earth free τ-phase of MnAl alloys has magnetic properties and is currently considered to have potential to replace currently used magnets, such as bonded $Nd_2Fe_{14}B$ rare earth permanent magnets. MnAl based magnetic materials (~50-60 at. % Mn) with the $L1^0$-type structure (τ-phase) have in particular great potential to become a high performance permanent magnet material at low cost, if a suitable processing route could be developed.

The room temperature stable phases in the MnAl phase diagram include γ2 (Al8Mn5), β (Mn) and the ferromagnetic τ-phase. The most common approach for synthesizing τ-phase MnAl alloys is by rapid quenching the high-temperature ε phase, followed by a heat treatment between 350 and 650° C. However, the τ-phase is metastable (see FIG. 1), and it is difficult to obtain MnAl alloys containing the τ-phase in high purity. So far, various heat treatments have been employed in order to obtain and preserve the τ-phase.

Oftentimes the τ-phase decomposes spontaneously and in particular upon further processing, and it is difficult to obtain pure τ-phase of high quality. This is in particular a problem if one wants to obtain powders of the alloy suitable for a permanent magnet alignment process, as this generally requires the powders to have a regular round shape and simultaneously high τ-phase purity. The powders should also be very fine, and most preferably there is only one grain (crystal) per particle, as this improves alignability and hence magnetic remanence. Yet, currently used processing methods for producing a powder form of the alloy (such as ball milling) distort the structure and partially destroy the τ-phase.

As derivable from FIG. 1, the τ-phase can only exist between about 49 to 60 atom % being Mn, the remainder being Al and unavoidable impurities. Further, as indicated by the hyperbolic dotted line in FIG. 2, the likelihood to form the τ-phase in binary compositions of Mn and Al is greatest at 54-55 atom % Mn. At the same time, the theoretical magnetic moment of the material is higher for compositions containing less Mn.

It has also been reported that the presence of dopants such as carbon can stabilize the τ-phase and facilitates the formation of an alloy resulting in an improved saturation magnetization, Ms. Further, Ms has also been reported to increase with carbon. These advantages are in part outbalanced by disadvantages, such as that the Curie temperature and anisotropy field are lower than those of undoped alloys.

In view of the above, most of the research up do date is devoted to MnAl alloys having a Mn content of 55 atom % or less, and containing no or only very little dopant, in order to obtain a material that maintains a τ-phase that has high magnetic moment as well as highest possible Curie temperature.

As one example, Z. Shao et al. describe in "One step preparation of pure t-MnAl phase with high magnetization using strip casting method" (AIP ADVANCES 7, 056213 (2017) the preparation of τ-phase MnAl alloys having a composition $Mn_{54}Al_{56}$. Reported is here also on the attempt to prepare τ-phase by strip-casting compositions of $Mn_{52}Al_{48}$ and $Mn_{56}Al_{44}$. While the τ-phase could be successfully synthesized for $Mn_{52}Al_{48}$ and $Mn_{54}Al_{56}$, it is reported that the strip-casted $Mn_{56}Al_{44}$ tends to form other samples, i.e., γ2 and β. All materials showed increasing amounts of γ2 and β after grinding. The material having the highest saturation magnetization (Ms) was $Mn_{54}Al_{56}$ strip, i.e., prior to grinding, exhibiting 114 emu/g (at 5 Tesla).

H. Fang et al reported that the τ-phase can be obtained by directly casting $Mn_{54}Al_{46}$ and $(Mn_{0.55}Al_{0.45})_{100}C_2$ (see Journal of Solid State Chemistry 237 (2016) 300-306) using a drop synthesis method involving a rapid cooling from 1400° C. of the melt to room temperature in 10 minutes. Here, the highest Ms of 111 emu/g (at 9 T) was obtained in the system of $(Mn_{0.55}Al_{0.45})_{100}C_2$.

The document further teaches that the crystalline order in the MnAl system is crucial for the magnetization, and that surplus Mn yields a "built in" disorder since on average 10% of the Mn atoms occupy the Al sites and interact antiferromagnetically with the Mn on the (0,0,0) sites. This is illustrated in FIG. 2. Here, the lines for "2%", "5%" and "8%" illustrate how the magnetic moment is influenced by the amount of misplaced Mn, i.e., where 2, 5 or 8% of the Al sites are replaced by Mn atoms, as compared to the ideal case. The ideal case for a 55% Mn/45% Al alloy is that 10% of the Al-sites are occupied by Mn atoms. Thus, for this composition 5% mismatch means that 15% Al-sites are taken by Mn.

Fang further suggests that the stability region of the β phase extends further than previously expected, extending up to 46 at % Al (corresponding to 54% Mn), in particular for materials that are processed subsequently by mechanical treatments such as high energy ball milling.

A comparison of τ phase MnAl prepared via different routes was provided by A. Chaturvedi et al. in J. Phys.: Condens. Matter 26 (2014) 064201, also using materials having the stoichiometric composition $Mn_{54}Al_{46}$. The materials were either gas atomized from the melt under argon, casting into ribbons using melt spin casting under argon, or pouring the molten alloy onto the face of a cooled copper dish rotating at high speed under argon, thereby forming alloy droplets.

The gas atomized material contained about 66% of the ε phase, and β and γ2 were also present. The document further states that annealing of milled powder (i.e., the material obtained after gas atomization of the melt and additional milling thereof using a water-cooled Union Process 1SD Svegari attritor) transforms the ε phase to the τ phase, yet the equilibrium γ2 and β phase are still present in essentially the same amounts as before annealing. It is further described that in milled materials the cooling rates of powders appears to be so high that the formation of the high temperature phase does not occur, and that β and γ2 form directly from the melt. It is concluded that the τ phase would not form this way, since it transforms from the ε phase and not directly from the melt.

Objects

It is an object of the present invention to provide a material having a high content of ε phase. This material is believed to be a good precursor for preparing the τ phase, as the τ phase forms from the ε phase.

It is a further object of the present invention to provide a method for preparing a MnAl alloy having a high content of the ε phase, i.e., to prepare a MnAl alloy having a high purity of the ε phase.

It is a further object of the present invention to provide a MnAl alloy having improved magnetic properties. In a related aspect, it is an object of the present invention to provide a MnAl alloy having a high content (or high purity) and/or quality of the τ phase, in particular (but not limited to) MnAl alloy materials in powder form. Here, the term "quality" in particular includes the aspects of homogeneity of the microstructure of the τ phase as well as a low mismatch of the site occupancy (i.e., ideal, or close-to-ideal, site occupancy by Mn and Al in the crystal lattice).

The present invention also aims at providing a method that is capable of providing such MnAl alloys, in particular a method that is industrially useful.

It is a further object of the present invention to provide an improved method for converting the ε phase into the τ phase.

It is yet another object of the invention to provide a MnAl alloy composition able to form τ or ε phase, which is relatively robust towards further processing steps and/or towards variations in the synthesis conditions such as cooling rate from the melt, and still leads to high purity of ε phase, and subsequently τ phase formed therefrom. Herein, the τ phase shows a good homogeneous microstructure, thereby allowing to obtain a material with improved magnetic properties (in particular Ms).

It is yet another object of the present invention to provide an improved synthesis route that includes a proper composition of the MnAl alloy as well as a preparation process including a suitable quenching (cooling) rate from the melt, ensuring a microstructure suitable for preparing high purity ε and subsequently τ phase. The resulting material is in particular suitable for later micronization steps, which are known to show the tendency to deteriorate the τ phase.

It is a further object of the invention to provide an MnAl alloy, preferably in particle form, showing both high magnetic saturation (Ms) and high coercitivity (Hc).

It is a further object of the invention to provide a method able to homogenize the microstructure of an MnAl alloy.

It is a further object of the invention to provide for a micronization process that can reduce the particle size and reduce grain size, and which allows the microstructure to become randomized and homogenized while also allowing for suitable magnetic properties.

In yet another aspect, it is an object of the present invention to provide means for obtaining an MnAl alloy containing τ phase and a having high magnetic saturation before a micronization process.

SUMMARY

All aspects of the present invention aim at providing materials and/or methods for their production that either have favorable magnetic properties themselves, or which are favorable precursor materials for preparing materials having favorable magnetic properties.

The present invention solves one or more of the above objects specifically by the following aspects:

1. An alloy represented by the formula (I)

$(Mn_xAl_y)C_z$            (I)

the alloy consisting of aluminum (Al), manganese (Mn), and carbon (C), and optionally unavoidable impurities;
    wherein
    x=56.0 to 59.0
    y=41.0 to 44.0
    x+y=100, and
    z=1.5 to 2.4.

2. The alloy according to aspect 1, wherein z=1.7 to 2.2, preferably 1.9 to 2.1

3. The alloy according to any one of aspects 1 and 2, wherein the ratio of x to z (x/z), is in the range of 26 to 33, preferably 28 to 30.

4. The alloy according to any one of aspects 1 to 3, wherein x=56.5 to 58.5 and y=41.5 to 43.5, and wherein preferably x=57.0 to 58.0 and y=42.0 to 43.0.

5. The alloy according to any one of aspects 1 to 3, which is by 90% by mass or more present as the ε phase.

6. The alloy according to any one of aspects 1 to 5, which is in the form of particles, preferably in the form of particles as obtainable by a gas atomization process.

7. A method for producing an alloy having a composition of formula (II)

$(Mn_{x'}Al_{y'})C_{z'}$            (II)

wherein
    x'=52.0 to 59.0
    y'=41.0 to 48.0
    x'+y'=100, and
    z'=0.1 to 3.0
    the alloy consisting of Mn, Al, optionally C and optionally unavoidable impurities,
    the process comprising one or more of the following steps:
    a. providing the raw materials of the alloy, melting the raw materials, and forming particles of the alloy by gas atomization of the molten alloy;
    b. performing a heat treatment on the alloy at 900-1200° C.;

c. milling the alloy represented by formula (II) at a temperature of −20° C. or below, preferably −100° C. or lower, further preferably −150° C. or lower; and/or d. performing a heat treatment on particles of the alloy represented by formula (II) at a temperature of 900 to 1000° C. for a time of 0.5 to 20 minutes, preferably 5 to 15 minutes (also referred to as "flash heat treatment" in the following).

8. The method according to aspect 7, wherein the alloy of formula (II) is an alloy of formula (I) as defined in any one of aspects 1 to 6.

9. The method according to any one of aspects 7 and 8, which comprises both the step c. of milling and the step d. of performing a heat treatment at 900-1000 C for 0.5-20 minutes, and wherein the milling c. is performed prior to the heat treatment d.

10. The method according to any one of aspects 7 to 9, wherein only step d. is performed, or wherein only step b. is performed.

11. The method according to any one of aspects 7 to 9, wherein all of steps a. to d. are performed, preferably in the order a., b., c., and d.

12. The method according to any one of aspects 7 to 9, which includes steps a., c., and d., and optionally step b.; or which includes steps a., b., and d., and optionally step c.

13. An alloy obtainable by the method according to any one of aspects 7 to 12.

14. An alloy according to aspect 13 or according to any one of aspects 1 to 6, which has a content of the τ phase of 80% or more, preferably 90% or more.

15. An alloy according to any one of aspects 13, 14 or according to any one of aspects 1 to 6, which has a saturation magnetization $M_S$ of 100 emu/g or more, preferably 110 emu/g or more, more preferably 117 emu/g or more, further preferably 120 emu/g or more, measured at 9 Tesla.

Further aspects and embodiments of the present invention will become apparent from the following detailed description.

A small excess of manganese and minimized reversed site occupancy (as compared to an ideal crystal phase), will result in higher magnetic moment.

The hyperbolic dotted line illustrates the probability to form the τ-phase. It shows that a close to perfect τ-phase crystal (i.e., <2% site occupancy reversal of Mn—Al) at high Mn-content (ca 57 at %) could give the same magnetic moment as a low Mn-content crystal (ca 53 at %) of somewhat worse quality (>8%), thereby illustrating the need for low misplacement levels at high Mn contents if good magnetic properties are required.

FIGS. 3a-3f XRD (left) and NPD (right) patterns of materials obtained in Example 1 prior to flash heating.

FIGS. 4a-4d XRD (left) and NPD (right) patterns of materials of Example 1 after flash heating for 5 or 15 minutes; a) and b) show after 2 h cryo milling (CM), and c) and d show after 4 h CM.

FIGS. 5a-5d Magnetization vs. magnetic field for the materials of Example 1, specifically a) drop-synthesized (DS), b) CM 2 h and CM 4 h, c) CM 2 h flash heated 1 and 5 minutes and d) CM 4 h flash heated 1 and 5 minutes, respectively.

Figure 6A:
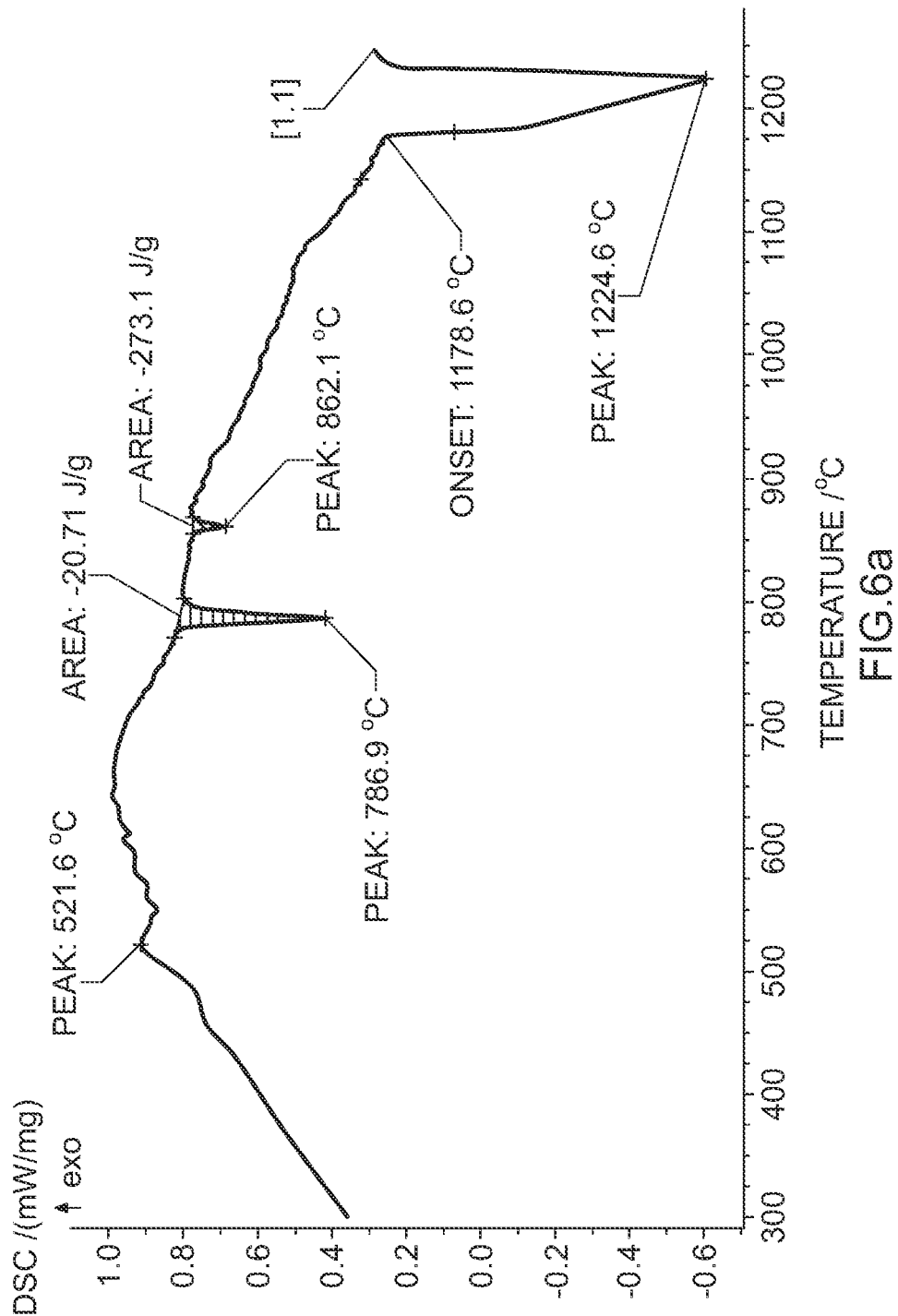
Figure 6B:
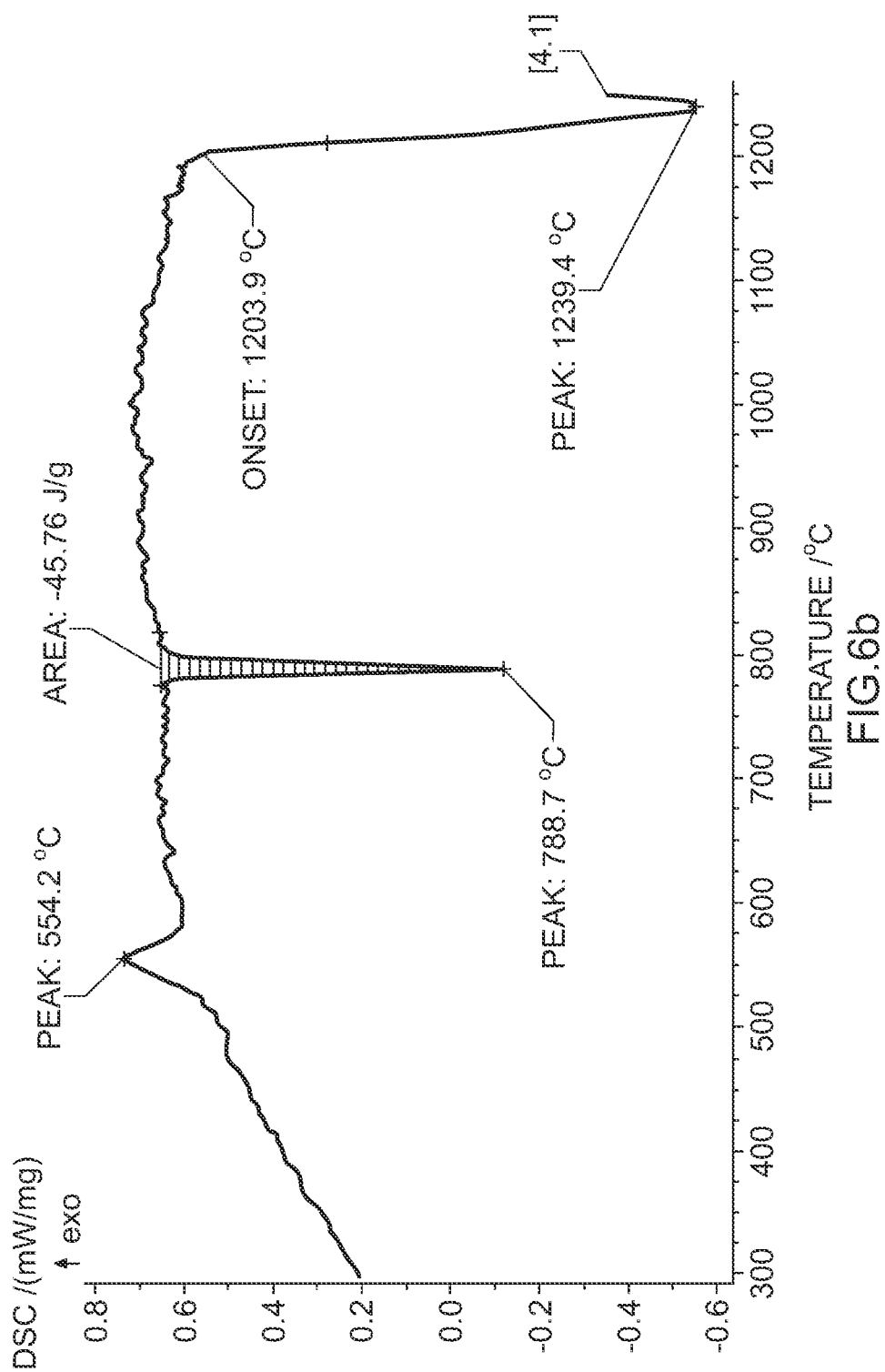

FIGS. 6a-6b DSCs graphs of materials obtained in accordance with Example 2, for a) $(Mn_{54}Al_{46})C_{0.76}$ (Example 2-B1) and b) $(Mn_{57}Al_{43})C_{2.14}$ (Example 2-A3)

Figure 7:
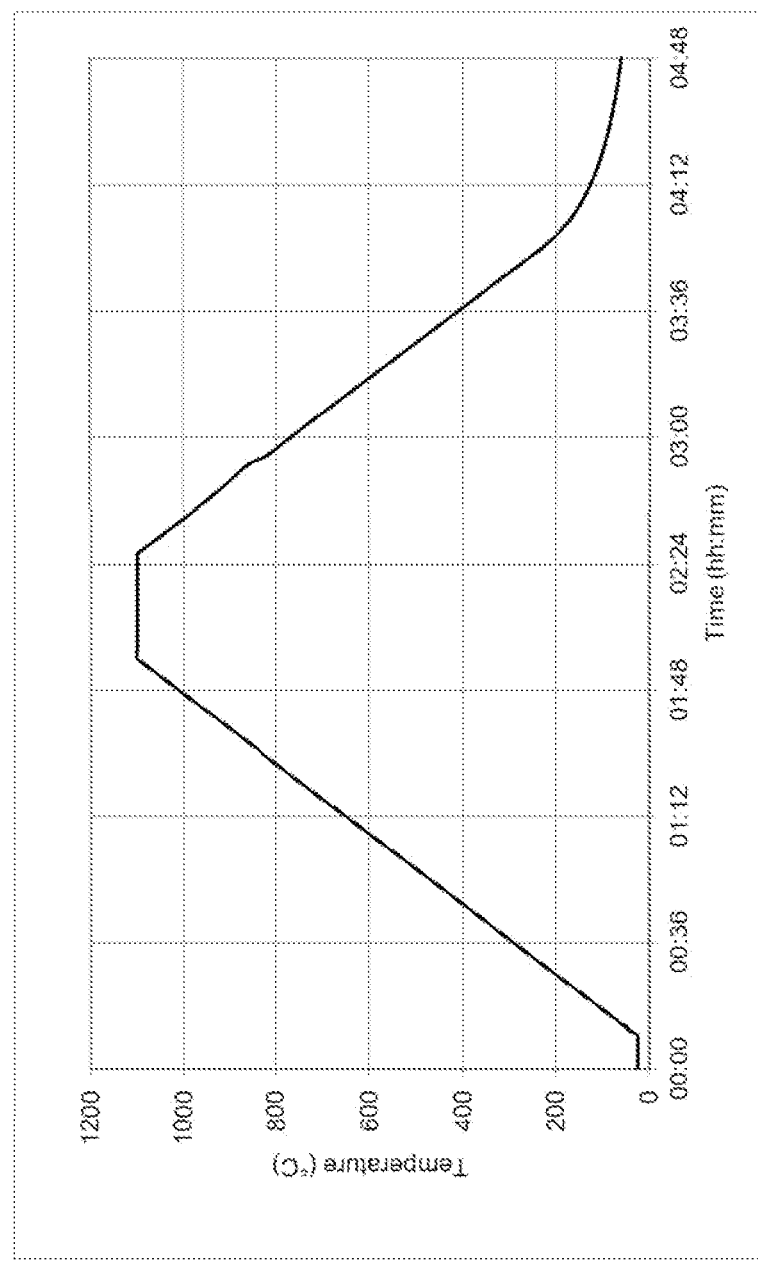

FIG. 7 Exemplary Temperature Curve for a heat treatment (step b.)

Figure 8:
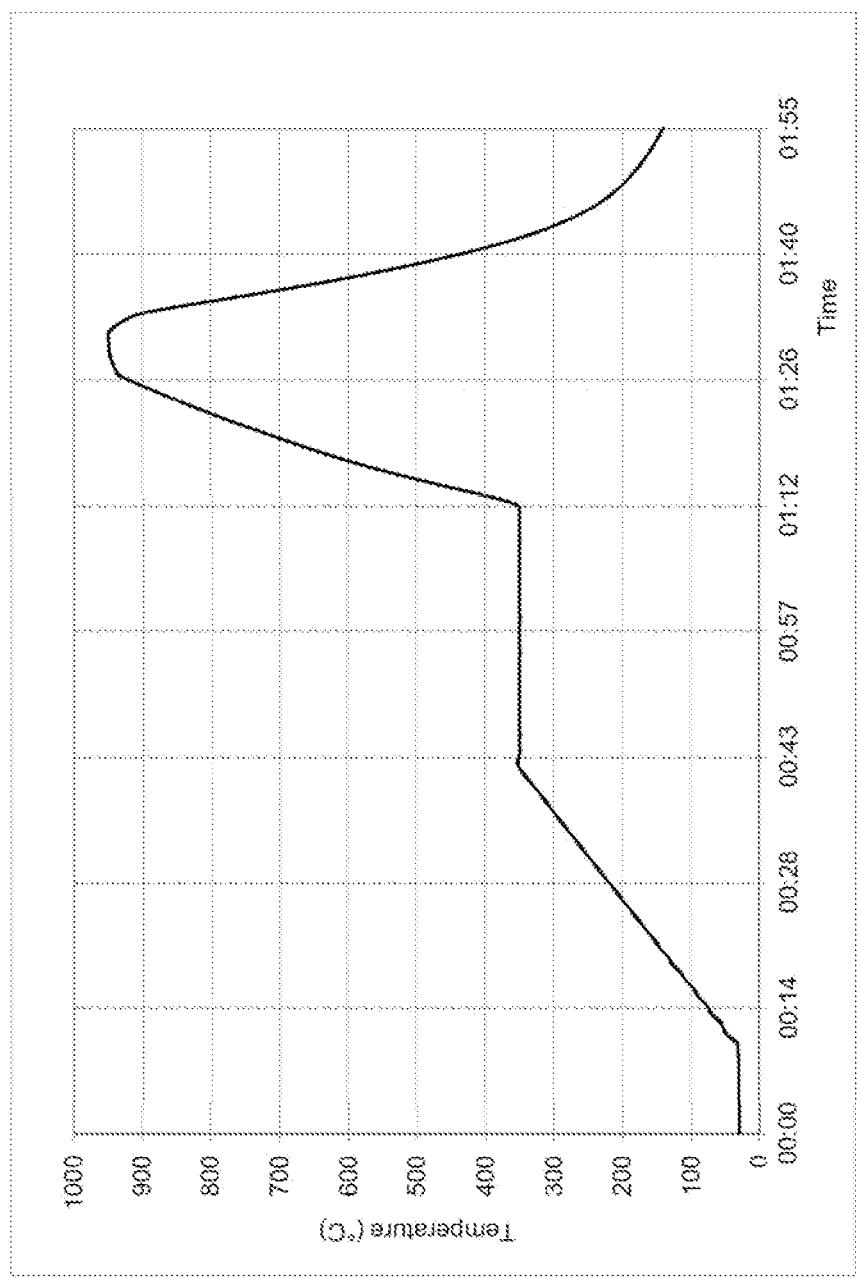

FIG. 8 Exemplary Temperature Curve for a flash heat treatment (step d)

FIGS. 9a-9g X-ray Powder Diffraction (XRPD) diagram of two samples with different stoichiometric compositions obtained after a) gas atomization from the melt, b) heat treatment at 650° C. for 3 hours under argon, c) heat treatment at 1100° C. for 30 minutes under vacuum, and d) of particles of identical stoichiometric composition prepared from particles in either ε or τ phase after milling followed by flash heat treatment.

The respective upper diagrams in FIGS. 9 a)-c) relate to a material having the composition $(Mn_{53}Al_{47})C_{1.50}$ (Example 2-B6), and the bottom diagrams relate to a material having composition $Mn_{57}Al_{43}C_{2.04}$.

FIG. 9d shows at the bottom the XRPD data of $(Mn_{57}Al_{43})C_{2.0}$ after gas atomization and cryo milling (milled ε phase), and at the top the XRPD of the same material, wherein between the steps of gas atomization (step a.) and cryo milling (step c.) a heat treatment for transforming the ε into the τ phase has been conducted (step b.).

FIG. 9e shows the XRPD data of as-synthesized (gas atomized) alloys with the composition (from top to bottom) $(Mn_{59}Al_{41})C_{1.33}$, $(Mn_{56}Al_{44})C_{0.96}$ and $(Mn_{57}Al_{43})C_{2.14}$.

FIG. 9f shows the XRPD of a sample of high τ-phase purity (content) after heat treatment at 1100° C. for 30 minutes, produced according to present invention ($(Mn_{57}Al_{43})C_{2.14}$ (bottom)), as well as the XRPD of two samples of lower τ-phase content after heat treatment of powder having composition outside the scope of formula (I) ($(Mn_{59}Al_{41})C_{1.33}$) (top) and $(Mn_{56}Al_{44})C_{0.96}$ (middle).

Figure 9A:
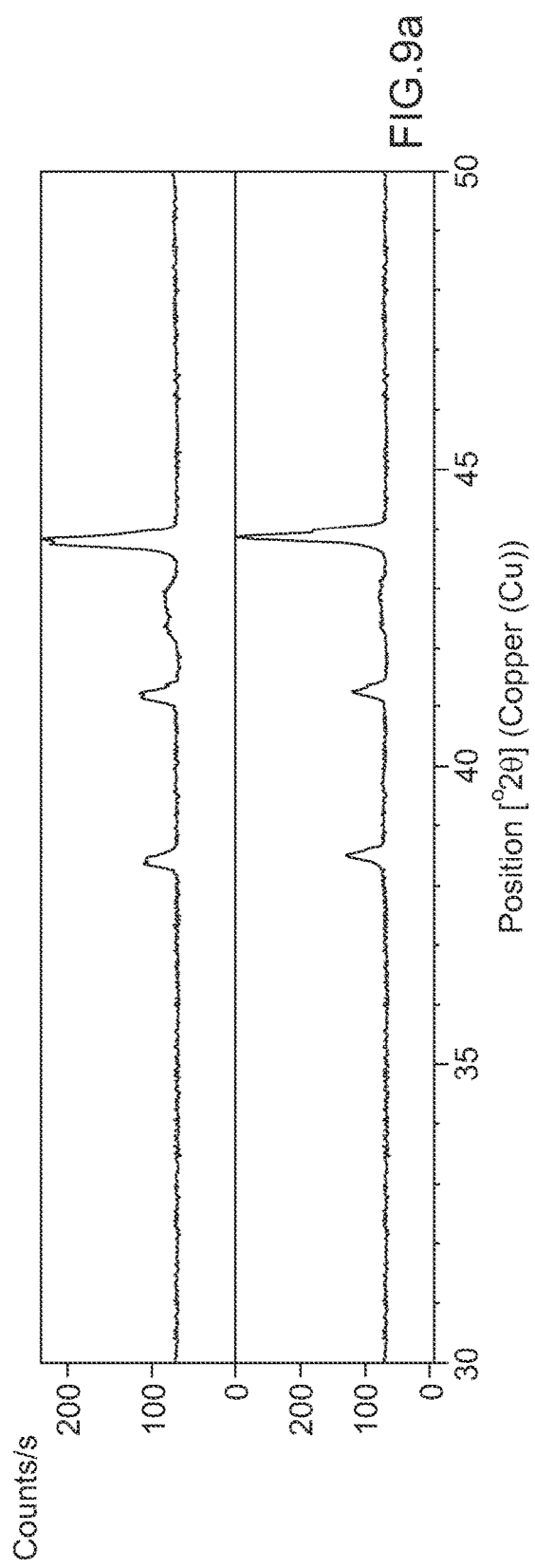
Figure 9B:
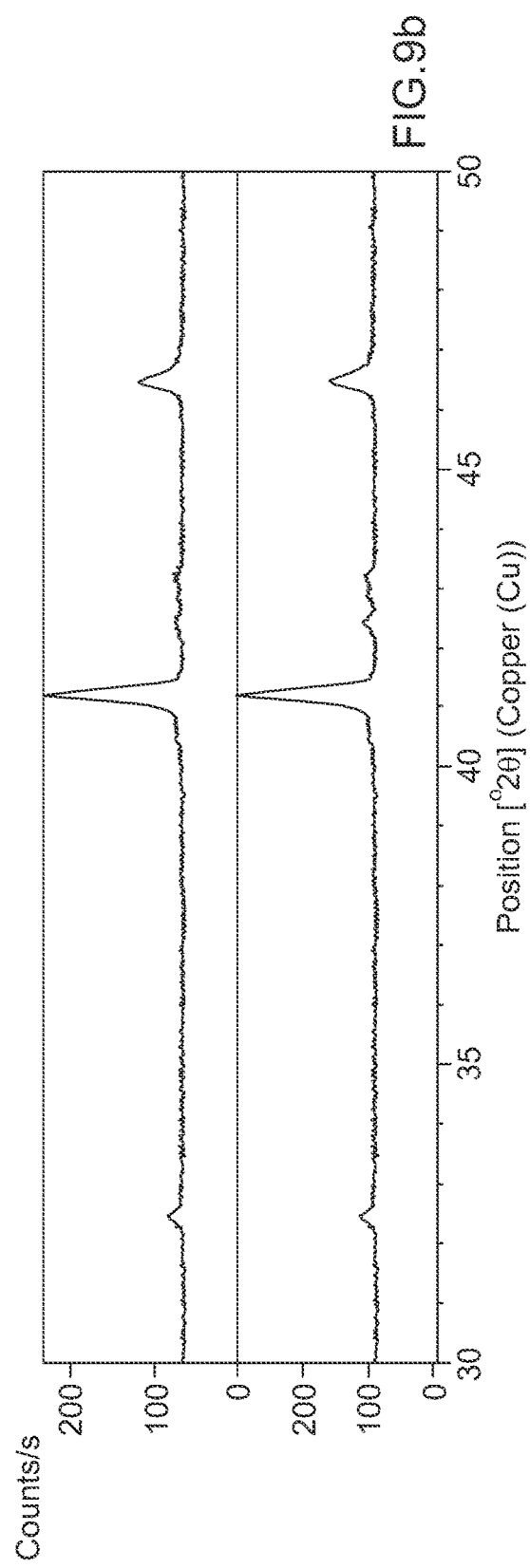
Figure 9G:
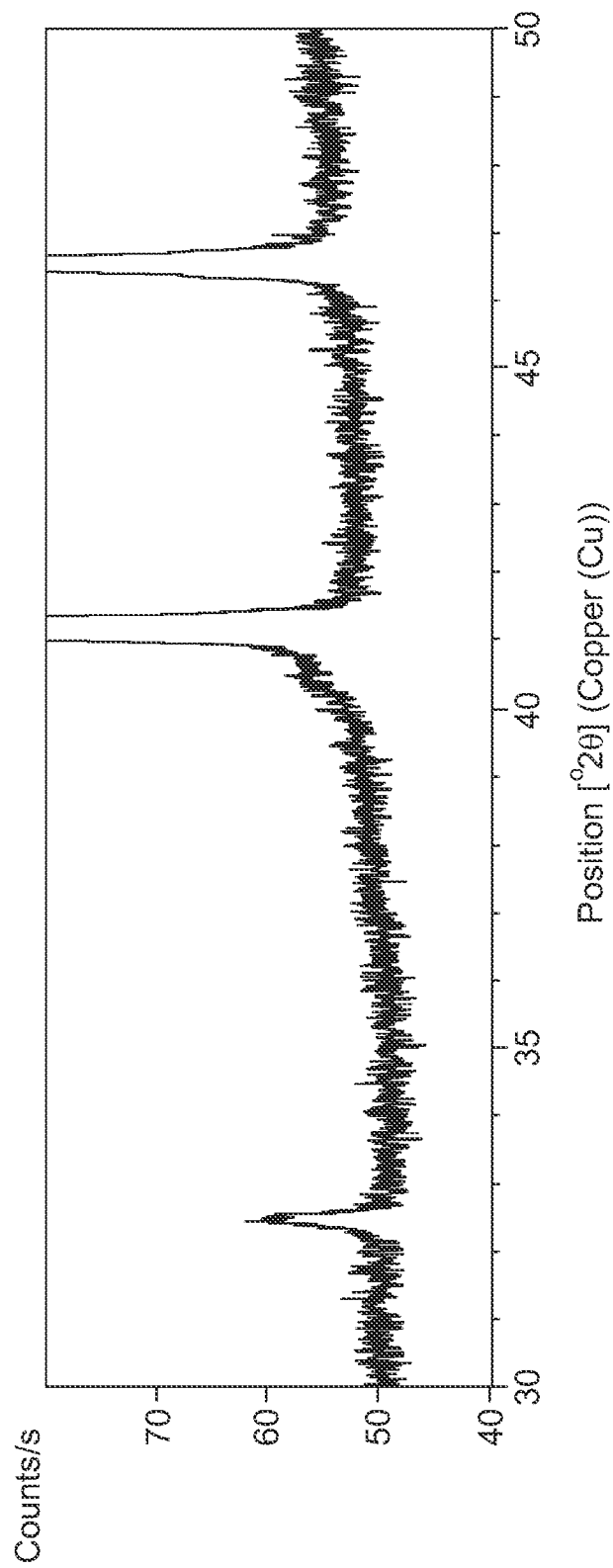

FIG. 9g: XRPD extract of a sample having the composition $(Mn_{57}Al_{43})C_{2.14}$, showing a slight excess of undissolved carbon that forms $Mn_3AlC$.

FIGS. 10a-10d SEM (Scanning Electron Microscopy) images of two samples with different stoichiometric compositions. The polished cross-sections of polymer embedded powders were prepared according to example 2.

FIG. 11 XRPD of two samples with different stoichiometric compositions obtained after heat treatment at 1100° C. for 30 minutes in argon. The upper diffractogram represent the sample shown in FIG. 10c (outside of formula (I), while the lower diffractogram represent the sample shown in FIG. 10d (within the scope of formula (I)).

FIG. 12 XRPD of two samples with different stoichiometric compositions obtained after milling according to example 2, and subsequently flash heated to 950° C.

Sample having a composition within the scope of formula (I) shows high content of τ-phase (bottom), while the reversed is observed for a sample outside the scope (top).

FIG. 13 XRPD of a sample with a stoichiometric composition ($Mn_{53}Al_{47}$)$C_{1.50}$ outside the scope of formula (I). The sample was milled according to example 1, thereafter flash heated to 950° C.

FIG. 14 XRPD of the same sample as FIG. 13, however, the sample was prior annealed at 650° C. to obtain the τ-phase prior milling according to example 1, thereafter flash heated to 950° C.

Figure 15:
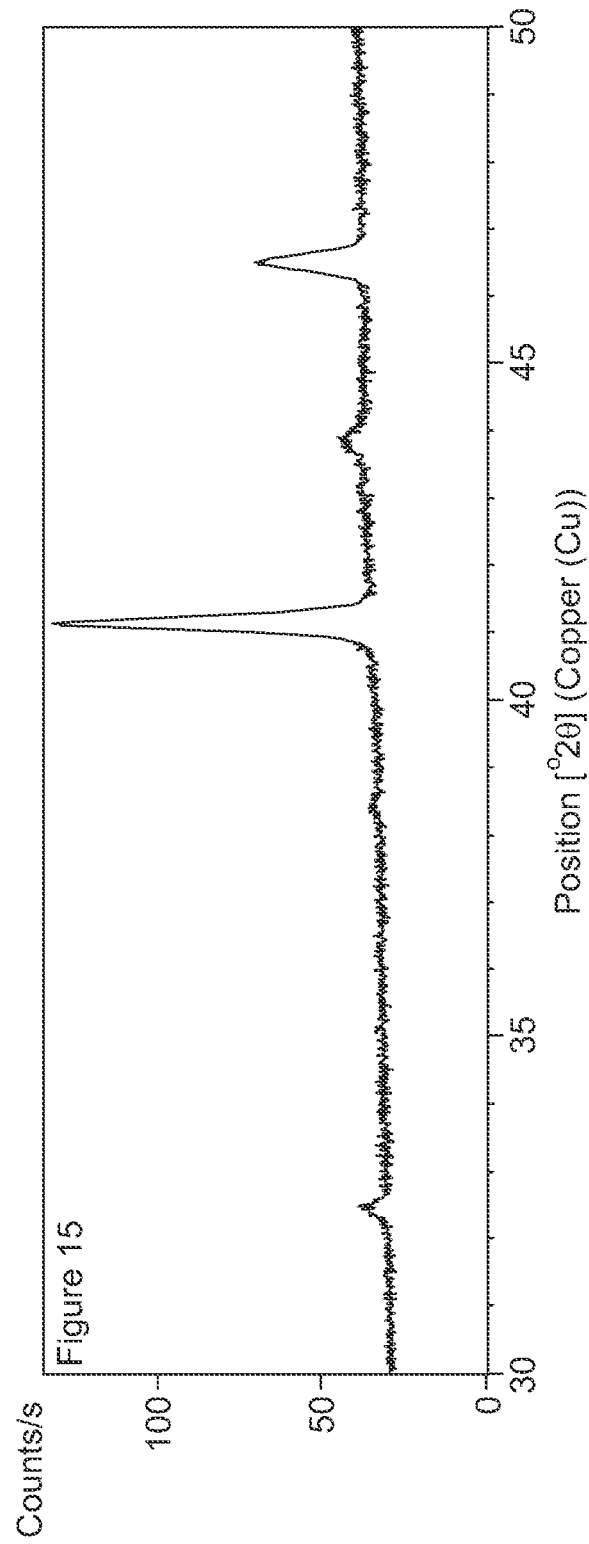

FIG. 15 XRPD of a sample with a stoichiometric composition within the scope of formula (I) ($Mn_{57}Al_{43}$)$C_{2.04}$. The sample was milled according to example 2 and subsequently flash heated at 950° C., in vacuum only. The magnetic properties of this sample are slightly worse than the corresponding sample treated in argon at 950° C.

DEFINITIONS

In the present invention, all physical parameters are measured at room temperature (20° C.) and at atmospheric pressure ($10^5$Pa), unless indicated differently.

As used herein, the indefinite article "a" indicates one as well as more than one and does not necessarily limit its reference noun to the singular.

The term "about" means that the amount or value in question may be the specific value designated or some other value in its neighborhood, generally within a range of ±5% of the indicated value. As such, for instance the phrase "about 100" denotes a range of 100±5.

The term and/or means that either all or only one of the elements indicated is present. For instance, "a and/or b" denotes "only a", or "only b", or "a and b together". In the case of "only a" the term also covers the possibility that b is absent, i.e., "only a, but not b".

The term "comprising" as used herein is intended to be non-exclusive and open-ended. A composition comprising certain components thus may comprise other components besides the ones listed. However, the term also includes the more restrictive meanings "consisting of" and "consisting essentially of". The term "consisting essentially of" allows for the presence of up to and including 10 weight %, preferably up to and including 5% of materials other than those listed for the respective composition, which other materials may also be completely absent.

Whenever ranges are indicated in the present invention, be it by the use of a hyphen as in "52-56", by using the word "to" instead of a hyphen, or by using the word "between", such as in "between 52 and 56", the respective end values of the range are included, so that e.g. the range of "52-56" includes the values of 52 and 56. These expressions however also cover the entire set of values within that range, so that the terms are used as abbreviation of the term "52 or more, but 56 or less".

The percentages relating to alloy compositions are atom-%, unless specified differently. All other percentages are by weight, unless indicated differently.

A particle size is typically defined as D50, unless stated otherwise. D50 defines that 50% by weight of the particles have the indicated size or smaller, as determined by a laser light scattering method.

During the manufacture of the alloy of the present invention and in the method for producing an alloy of the present invention, certain heat treatments within a specified temperature range for a time within a specified range may be conducted. An example is a case wherein "a heat treatment at a temperature of 300 to 500° C. for a time of 1 to 3 hours" means that the alloy is kept at a temperature within the range of 300 to 500° C. for a time of 1 to 3 hours. The time used for heating up to the lower limit (e.g., 300° C.) and cooling below the lower limit is not taken into account for the specified duration of the heat treatment. Further, the upper limit is typically not exceeded in such heat treatment steps.

The numerical values of characteristics and properties of the materials employed or produced in the present invention relate to the values obtained by using the instruments and conditions employed in the Examples. In case of differences or discrepancies, the following conditions prevail:

The specified saturation magnetization values are in Emu/g as measured at an applied field of 9 T (using a Physical Property Measurement System, PPMS, as available from Quantum Design, Inc. at room temperature 200 and 1 atm), unless specified differently.

For saturation magnetization data measured at an applied field of 1.8 T (using a Vibrating Sample Magnetometer, VSM), the values have for comparison purposes been converted to correspond to a 9 T-measurement, based on a conversion factor obtained from previous measurements where both instruments have been used on the same sample.

The coercive force is specified in kA/m assuming a material density of 5100 kg/m$^3$. This density may also be assumed for any other desired conversion, such as for converting a volume-based parameter into a weight-based parameter.

Whenever in the present invention reference is made to the content of a crystalline phase in %, the respective value refers to the value obtained by an XRPD analysis with Rietveld refinement as described in example section 1.3.

In the present invention, the alloys are represented by e.g., formula (I) with the composition ($Mn_xAl_y$)$C_z$, wherein x=56.0 to 59.0, y=41.0 to 44.0, x+y=100, and z=1.5 to 2.4. This is equivalent to the representation ($Mn_{0.x}Al_{0.y}$)$_{100}$$C_z$. Hence, there are z atoms of C relative to 100 atoms of the total of Al and Mn. The same applies to formula (II).

DETAILED DESCRIPTION

As outlined in the passages above, most of the attempts for preparing MnAl alloys comprising a high amount of τ phase have focused on materials that have a Mn content of 55% or less. Further, while there have been attempts to stabilize the τ phase by addition of carbon as a dopant, these attempts have also been made with MnAl alloys having such a Mn content. Little attention has so far been paid to producing a MnAl alloy showing a high content of Mn (e.g., 56 at.-% or more, such as between 56.5 and 57.5 at.-%, relative to the total of Mn and Al)

The present invention is in one aspect based on the finding that a key step in the preparation of an MnAl alloy having a high content of τ phase is the preparation of an MnAl alloy having a high content of ε phase. The present invention furthermore provides a method for preparing such MnAl alloys having a high content of ε phase (e.g., 75% or more, such as 80% or more, 85% or more, or 90% or more) by employing specific process conditions other than those used or suggested in the prior art, as will be explained in more detail below.

The present invention is in another aspect based on the surprising finding that MnAl alloys having a high content of τ phase can be prepared from compositions of formula (I), i.e. compositions consisting of relatively high amounts (56.0-59.0 at % of the total of Al and Mn) of manganese and low amounts (41.0-44.0 at % of the total of Al and Mn) of aluminum, in combination with a specific amount of carbon of 1.5 to 2.4 at-%.

Compositions satisfying formula (I) can surprisingly be processed such as to contain a high content of τ phase and may thus provide materials with improved magnetic properties. The carbon content may preferentially be chosen such as to be linked to the amount of Mn, such that the molar ratio of Mn/C is in the range of 26 to 33, more preferably 28 to 30. With these preferably and more preferably carbon contents, the alloy is experimentally saturated with carbon dissolved in the alloy, so that the τ phase can be stabilized most effectively.

The present invention is in a further aspect based on the surprising finding that particles of an MnAl alloy having favorable magnetic properties can be prepared by a process involving specific milling conditions at low temperature and/or specific heating conditions (also referred to as "flash heat treatment" in the following).

The features and aspects of the present invention will be described separately in the following more detailed description:

Alloy of Formula (I)

In a first aspect, the present invention relates to alloys of formula (I) as defined below:

$$(Mn_xAl_y)C_z \qquad (I)$$

the alloy consisting of aluminum (Al), manganese (Mn), and carbon (C), and optionally unavoidable impurities;
wherein x=56.0 to 59.0; y=41.0 to 44.0; x+y=100, and z=1.5 to 2.4.

Herein, the term "unavoidable impurities" includes any element other than Al, Mn, and C, and typically denotes impurities that originate from the raw materials used for producing the powder or that are introduced during the manufacturing process. The total content of such impurities is typically 0.5% by mass or less, preferably 0.25% by mass or less, and further preferably 0.1% by mass or less, relative to the total mass of the alloy.

Compared to prior art alloys, the alloy of formula (I) combines a relatively high manganese content with a carefully defined carbon content. Without wishing to be bound by theory, it is believed that the interstitial positions in the ferromagnetic τ phase are occupied by carbon, making the τ phase more thermodynamically stable or favorable. Further, again without wishing to be bound by theory, the combination of carbon with manganese in an amount of 56.0-59.0 at.-% (relative to the total of Al and Mn) allows obtaining a more homogeneous microstructure of the MnAl alloy in both ε and τ phase (see FIG. 10). This homogeneous microstructure may at least partially be preserved during possible further processing steps, so that the alloy of formula (I) provides an improved precursor material for final applications.

Again, without wishing to be bound by theory, addition of carbon at the octahedral interstitial sites (½, ½, 0) is believed to be an effective way of stabilizing the tetragonal structure of the τ phase with an elongation along the c-axis. While carbon reduces the Curie temperature, it increases the saturation magnetization (Ms) with a larger resultant magnetic moment. The increase in stability by carbon doping is believed to occur because the interstitial atoms inhibit the diffusion of the Mn and Al atoms.

This finding is truly surprising, as it was generally considered that carbide precipitates will form at higher carbon concentrations that will act as nucleation sites for the equilibrium phases when the C addition exceeds the solubility limit. It has now surprisingly been found that at higher manganese contents it is possible to dissolve even more carbon, and thus, it is possible to increase the stability of the τ phase. Furthermore, the workability is also improved due to the small carbon atoms, which are believed to relieve internal lattice stresses.

Suitable magnetic properties in a material having a high τ phase content have been obtained when the value of z, representing the number of carbon atoms relative to 100 (Al+Mn) atoms, is 1.5 or higher, preferably 1.7 or higher, more preferably 1.9 or higher. At the same time, the maximum value of z is 2.4 or less, preferably 2.2 or less, more preferably 2.1 or less.

The value of x, representing the number of manganese atoms relative to 100 (Al+Mn) atoms, is 56.0 or higher, preferably 56.5 or higher, more preferably 57.0 or higher. At the same time, the value of x is 59.0 or less, preferably 58.5 or less, more preferably 58.0 or less.

The value of y, representing the number of aluminum atoms relative to 100 (Al+Mn) atoms, is chosen such that the sum of x+y=100. y is 44.0 or less, preferably 43.5 or less, more preferably 43.0 or less, and is at the same time 41.0 or higher, 41.5 or higher, more preferably 42.0 or higher.

The value of z, representing the number of carbon atoms relative to 100 (Al+Mn) atoms, is 1.5 to 2.4. The lower limit of z is thus 1.5 or higher, such as 1.6 or higher, 1.7 or higher, 1.8 or higher or 1.9 or higher. The upper limit is 2.4 or lower, but can also be 2.3 or lower, 2.2 or lower, or 2.1 or lower. These lower and upper limits can be combined in any way, and in preferred embodiments the value of z is 1.7 to 2.2, more preferably 1.9 to 2.1.

The values of x, y and z can be adjusted by appropriately mixing suitable amounts of the starting compounds for the alloy production, which are typically elementary manganese, elementary aluminum, and graphite. In the final alloy, the values of x, y and z can be determined by analyzing the relative content of the metals by a suitable technique, such as ICP-AES (Inductively Coupled Plasma—Atomic Emission Spectroscopy and LECO elemental analysis for C, N, P and S, or Spark Optical Emission Spectroscopy.

Given the above relationship between the amount of Mn and C, the ratio of x to z (x/z) is preferably 26 or higher, more preferably 27 or higher or 27.5 or higher, and still more preferably 28 or higher, and preferably simultaneously 33 or less, more preferably 32 or less or 31 or less, and still more preferably 30 or less. By adjusting the relative amounts of Mn and C such that x/z falls within these ranges, maximum stabilization of the τ phase and at the same time good magnetic properties can be maintained. Without wishing to be bound by theory, it is believed that with a lower Mn/C-ratio, such as lower than 26, the risk of excess carbon being present that might form e.g., $Mn_3AlC$ upon heat treatment may not be completely excluded. This risk is further minimized if the ratio of Mn/C, i.e. (x/z), is adjusted to satisfy the above-mentioned preferable and more preferable ranges.

While it is possible to form the τ phase directly from the melt, it is common to first form the ε phase, followed by formation of the τ phase by suitable heat treatment.

Hence, in a preferred aspect, the alloy of formula (I) has a content of the ε phase of 80% or more, more preferably 85% or more, further preferably 90% or more, determined by a the XRPD method using Rietveld refinement as described in Example 1.3.

Method for Producing MnAl Alloys of Formula (I) and (II)

While the method for preparing the alloy of formula (I) is not specifically limited, the alloy of formula (I) can suitably and preferably be prepared by the method described below for the alloys of formula (II). In this case, particularly preferred characteristics can be obtained, yet the method is also applicable to other carbon-containing alloys of formula (II). Formula (I) is thus a preferred sub-set of the alloys of formula (II).

As is well known, the synthesis parameters, i.e., melt temperature, quenching- or cooling rates of the melt, have an impact on the homogeneity of the microstructure, and suitable parameters can generally be chosen by a skilled person based on common general knowledge and/or be turning to the preparation conditions described in the examples. It is therefore preferred to choose synthesis conditions and subsequent process conditions for the material in such way that inhomogeneity is as far as possible eliminated.

The melt temperature is typically in the range of 1300° C. or higher, preferably 1350° C. or higher, more preferably 1400° C. or higher, such as 1450° C. The melt should be homogeneous, so that the melt is held for some time (e.g., 5-20 minutes or even longer) in the molten state at high temperature in order to allow a good mixing and diffusion of the components.

Subsequently, the melt is processed to form a solidified material. Depending on the cooling rate either $\varepsilon$- or $\tau$-phase can be formed directly from the melt. Normally, higher cooling rates than about 10° C./s will result in $\varepsilon$-phase, while slower cooling rates at below ~1000° C. could result in the magnetic $\tau$-phase directly.

Hence, where the material obtained directly from the melt is desired to have a large content of the $\varepsilon$ phase, rapid cooling from the melt is preferred. A high cooling rate is preferred not only to form the $\varepsilon$ phase in high purity, but also to ensure a homogeneous composition as well as microstructure (minimize segregates) inside the solidified material. In order to avoid formation of the more thermodynamic stable phases (in particular $\beta$ and $\gamma 2$) as well as to obtain an even distribution of the raw materials, the average cooling rate between the melt temperature and approximately 1150° C. is preferably $10^{3\circ}$ C./s or higher, more preferably $10^{4\circ}$ C./s or higher, still more preferably $10^5$ C/s or higher. Furthermore, in order to favor a direct formation of an alloy having high content of the $\tau$ phase, and suppress formation of e.g., $\beta$ and $\gamma 2$-phases, the average cooling rate below approximately 1050° C., and above approximately 650° C. is between 10° C./min and 40° C./min, preferably between 15° C./min and 25° C./min, more preferably about 20° C./min.

If the quenching rate and/or the mixing of the components in the melt prior to atomization has been insufficient, the material may exhibit regions of different composition caused by microstructural variations with different crystallinity and may then also show a relatively large difference in composition between the regions/segregates. The regions of lower crystallinity exhibit a significantly lower Mn/Al-ratio and, thus also lower carbon content due to the decreased solubility of carbon in the presence of less manganese. Larger differences in composition between these region/segregates has been found to be undesirable, as it may lead to cause inhomogeneities on a microstructural level even in materials that have undergone further processing steps.

Further, the cooling rate in a "natural cooling process" (such as described e.g., by Fang in Journal of Solid State Chemistry 237 (2016) 300-306) depends on various factors, such as shape and volume of the alloy cooled (e.g., in ingot form), the temperature of the atmosphere, etc. In this article, the cooling process was described to exhibit a cooling rate from 1400° C. to room temperature in about 10 minutes, which equates to an average cooling rate of about 2.3° C./s.

This shows that a natural cooling process, of e.g., an alloy cast from the melt to form an ingot, is typically too slow to lead to the formation of a pure E phase of homogeneous microstructure, but still too fast to allow the direct formation of $\tau$ phase. If a material having a high content of $\varepsilon$ phase is desired, additional measures need to be taken in order to achieve higher cooling rates. These include in particular measures for forming droplets from the melt in order to increase surface area relative to the mass of the melt, thereby increasing cooling rates, and forced cooling, e.g., bringing the molten alloy (preferably in droplet form) into contact with a cooling medium such as a cooling substrate, a cooling gas, or a cooling liquid, e.g., water. Suitable methods thus include gas or liquid atomization, melt spinning or spin casting. Gas atomization is preferred, as it is scalable and produces particles having an almost round or spherical shape that allow good orientation in a magnetic field, and which require little or no further mechanical processing such as milling in order to obtain a powder material suitable for further processing and final application after conversion of the $\varepsilon$ phase to the ultimately desired $\tau$ phase. Further, gas atomized particles show good homogeneity and little crystal defects, as gas atomization is believed to exert little stress on the internal structure of the alloy during cooling, thereby facilitating the formation of a relatively homogeneous crystal structure with large single crystalline domains.

The cooling of the alloy (e.g., during gas atomization) from the melt is preferably conducted in inert gas atmosphere, such as argon or nitrogen, in order to avoid the formation of oxides and to maintain a homogeneous structure. Cooling the liquid droplets into a tank of water can also be applied to reach even higher cooling rates, however, with the expense of higher oxygen contents.

By providing a melt of the MnAl alloy of formula (I) and performing a cooling process under inert gas atmosphere or water employing a cooling rate rapidly enough to avoid substantial formation of impurity phases (e.g., $\beta$, $\gamma 2$) or the $\tau$ phase, a material that is homogeneous and rich in $\varepsilon$ phase can be obtained. This material, such as obtained by gas atomization of the melt and cooling under inert gas or water conditions, is an excellent precursor material for the further processing steps, in particular the flash heat treatment step for transforming the $\varepsilon$ phase into the $\tau$ phase. Care should however be taken to avoid extreme cooling rates of e.g., higher than $10^5$ or 106° C./s, as this might disturb the crystallization process and may lead to a lower purity of the desired $\varepsilon$ phase.

It has further been found that the alloy composition of formula (I) is less sensitive to the synthesis conditions, in particular as regards the quench rate from the melt, and still allows obtaining a homogeneous microstructure under conditions that lead to less homogeneous/more heterogeneous microstructure for alloys that do not conform to formula (I), due to a lower Mn content. This is illustrated in the Figures, in particular in FIGS. 9-11, which will also be explained in more detail in the following description of step a. It is however noteworthy that the following effects are believed to occur independently of the specific step of gas atomization (step a), i.e., also for alloys of formula (I) that are produced without a step of gas atomization from the melt, but by different techniques.

FIG. 9a shows on the top the diffractogram (XRPD) of an alloy having the composition $Mn_{53}Al_{47}C_{1.50}$, and in the bottom of an alloy of the composition $Mn_{57}Al_{43}C_{2.04}$, both directly after gas atomization under identical conditions. As can be seen from the XRPD data, the sample at the top (falling within the scope of formula (II), but not formula (I)) shows a reasonably good purity, yet some impurities ($\gamma 2$, $\beta$) are also present as derivable from the minor peaks around 42-43° in 2θ. Such peaks are also present in the lower FIG. showing the diffractogram of the alloy having a composition of formula (I), yet to a lesser extent.

Interesting to note is also the difference in structural homogeneity, as represented by the SEM pictures shown in FIGS. 10 a) and b). Here, both samples show a microstructure composed of grains (dark in FIGS. 10 a) and b)) and a matrix phase (bright in FIGS. 10 a) and b)). Both of the grains and the matrix are present mainly in the ε phase, yet differ in respect of their composition. The grains are formed of a phase $\varepsilon_1$ having a high Mn and C content, while the matrix is formed of a phase $\varepsilon_2$ having a high Al content. The matrix areas show nanocrystallinity, i.e., have a lower ability to crystallize.

Interestingly, in the alloy conforming to formula (I), the difference in composition between the matrix and the grains is smaller as compared to the alloy conforming to formula (II) (but not formula (I)). The sample conforming to formula (I) has thus a more homogeneous microstructure. Without wishing to be bound by theory, it is believed that this difference in the compositional difference between the $\varepsilon_1$ and $\varepsilon_2$ phase is caused by the combined presence of carbon and relatively high amounts of Mn, such that the Mn/C ratio is within the preferred and more preferred ranges described above. Apparently, the presence of carbon in the required amount helps avoiding the formation of segregates, leading to a more homogeneous structure.

This homogeneity of the microstructure of the as-synthesized ε phase also influences the microstructure of the subsequently formed τ phase. This is illustrated in FIGS. 10 c) and d). The sample conforming to formula (II) (but not formula (I)) having the greater inhomogeneity of the microstructure produces, upon heating at 1100° C. in vacuum for 30 minutes, a microstructure showing high inhomogeneity consisting mainly of τ, γ2, and 3 (see FIG. 10 c)). Conversely, the sample conforming to formula (I) leads to a much more homogeneous microstructure of predominately τ-phase (see FIG. 10 d)), which in turn allows obtaining a higher Ms.

This difference in structure is also observable by a DSC analysis. FIG. 6 a) shows the DSC analysis of a sample conforming to formula (II) ((Mn$_{54}$Al$_{46}$)$_{100}$C$_{0.76}$), but not formula (I). The DSC shows an exothermic peak around 522° C. that represents the formation of the τ phase. Upon further heating, there are two endothermic peaks around 787 and 862° C., which represent the re-formation of the ε phase from the τ-phase. The occurrence of two different peaks in the DSC shows that the τ-phase formed actually consists of at least two different phases, one converting back to the ε-phase at around 787° C. and the other one converting back to the ε phase at around 862° C. This is in good agreement with the structure observed in FIG. 10 c).

The DSC graph of a sample conforming to formula (I) ((Mn$_{57}$Al$_{443}$)$_{100}$C$_{2.14}$) is shown in FIG. 6 b. Here, there is one exothermic peak around 554° C. representing the formation of the τ phase, and one peak around 789° C. representing the re-formation of the ε phase. Notably, there is no peak at higher temperatures as in FIG. 6 a), showing that the microstructure is more homogeneous and essentially consists of one τ-phase only. This is good agreement with the structure observed in FIG. 10 d).

It follows that the alloy composition of formula (I) having the right balance between Mn and C (i.e., having the suitable Mn/C ratio) allows obtaining a more homogeneous ε phase and a more homogeneous τ phase as compared to alloys having lower Mn content and/or in an incorrect carbon amount, i.e., with an unsuitable Mn/C ratio. The alloy of formula (I) is thus in one embodiment characterized by a DSC graph showing one endothermic peak of 15 J/g or more, preferably 25 J/g or more and further preferably 35 J/g or more, such as 40 J/g or more, in the temperature range of 780-810° C. (or 780-800° C.), and either no endothermic peak in the temperature range of 840-880° C. or an endothermic peak in the in the temperature range of 840-880° C. of 5 J/g or less, preferably 3 J/g or less, and more preferably 2 J/g or less, determined by a DSC method using a heating rate from room temperature to 1300 C.° at 10° C./min. Thereby, a more homogeneous τ-phase can be formed. While it is also possible to obtain the ε phase outside the composition of formula (I), this ε shows the tendency to not only form the τ-phase upon proper heat treatment, but to also form the thermodynamically more stable β- and γ2-phases. Within the scope of formula (I), thus an ε-phase can be obtained that is more suitable for obtaining a more pure and more homogeneous τ-phase.

An MnAl alloy of formula (I) can then, after formation of the ε and/or the τ phase, be processed further. For instance, the τ phase MnAl alloy of formula (I) (e.g., obtained by first forming the ε phase and then converting the ε phase into the τ phase by a suitable heat treatment, as described for instance below for step b., or by other suitable treatment) can be subjected to a milling process. This milling process can be the low temperature cryo milling step c., but can also be another suitable milling process known in the art, such as ball milling at another temperature, such room temperature (20° C.).

Method

In the method of the present invention, an alloy of formula (II) is used. This formula is given below:

$(Mn_{x'}Al_{y'})C_{z'}$ (II)

wherein x'=52.0 to 59.0; y'=41.0 to 48.0 x'+y'=100, and z'=0.1 to 3.0; the alloy consisting of Mn, Al, optionally C and optionally unavoidable impurities. Herein, the term "unavoidable impurities" includes any element other than Al, Mn, and C, and typically denotes impurities that originate from the raw materials used for producing the powder or that are introduced during the manufacturing process. The total content of such impurities is typically 0.5% by mass or less, preferably 0.25% by mass or less, and further preferably 0.1% by mass or less, relative to the total mass of the alloy.

Notably, formula (I) is a subset of formula (II), i.e., formula (I) is completely encompassed by formula (II). Formula (I) represents a preferred embodiment of formula (II). In one embodiment of formula (II), x' is chosen such that Mn does not form 52, 53, 56 or 58 atom % of the entire composition, and y' is chosen such that Al does not form 42, 44, 47 or 48 atom % of the entire composition. In another embodiment (which can be combined with the previous embodiment), z' is chosen such that carbon does not form 9 or 3 atom % of the entire composition. In yet another embodiment, the alloy of formula (II) does not have the composition Mn$_{51}$Al$_{46}$C$_3$.

In the following, a more detailed description of the method steps for processing an alloy of formula (II) or (I) of the present invention is given. Notably, the alloy of formula (I) can also be prepared and processed differently, but is preferably also prepared and/or processed by the method of the present invention. For instance, the alloy of formula (I) may be subjected to a gas atomization process from the melt (as in step a.), yet it is possible to produce a starting material for step b., step c. and/step d differently, e.g., by strip casting.

It goes without saying that in addition to the method of the present invention as described below, additional process steps may or may not be conducted on the alloy of formula (II) or (I).

The method of the present invention comprises one or more of the following steps a. to d.:

a. providing the raw materials of the alloy, melting the raw materials, and forming particles of the alloy by gas atomization of the molten alloy;
b. performing a heat treatment on the alloy at 900-1200° C. for 5 hours or less;
c. milling the alloy represented by formula (II) at a temperature of −20° C. or below, preferably −100° C. or lower, further preferably −150° C. or lower; and/or
d. performing a heat treatment on particles of the alloy represented by formula (II) at a temperature of 900 to 1000° C. for a time of 0.5 to 20 minutes, preferably 5 to 15 minutes.

Step a.

In this step, the raw materials of the alloy (typically powders of manganese and aluminum as well as graphite) are provided, the raw materials are melted, and particles of the alloy are formed by gas atomization of the molten alloy.

The temperature of the alloy reached in the melting step is not particularly limited, but is typically in the range of 1300° C. or higher, preferably 1350° C. or higher, more preferably 1400° C. or higher, such as 1450° C. or higher. It is preferable to heat the material to the melt for a sufficient time in order to obtain a homogeneous melt by thermal diffusion of the components, e.g., for 5-20 minutes or longer at 1400° C. or higher, such as 1500° C.

The step a. is preferably conducted under inert gas atmosphere (such as argon or nitrogen), in order to avoid the formation of oxides. For the same reason, the gas used for the gas atomization is preferably oxygen-free, and is preferably selected from argon, nitrogen, helium, and neon. The atomization gas is normally argon or nitrogen (at a pressure between 5 to 300 bar, more preferably between 10 to 100 bar, such as 20 bar).

The formation of the particles by gas atomization has the advantage over other techniques for preparing alloy particles, such as grinding of a cast ingot, that the stress on the alloy is low, so that disturbances of the crystal structure can be minimized. This in turn allows obtaining a more homogeneous material.

Further, the obtained particles have an almost spherical shape, which is preferably for many later process steps and/or end applications. Specifically, the round shape of the obtained particles allows easy orientation in a magnetic field, which can be beneficial even after a milling step as it allows an increase in powder density and improvement of powder flow and facilitates alignment.

Finally, the gas atomization process allows obtaining a rapid cooling of the molten alloy, which avoids the formation of the $\tau$ phase and leads to particles having a high content (purity) of the $\epsilon$ phase. This, in turn, allows obtaining particles having a high $\tau$ phase content in a subsequent treatment step transforming the $\epsilon$ phase into the $\tau$ phase.

While step a. can be applied to all MnAl alloys having a composition within the scope of formula (II), it is preferably employed for a MnAl alloy having a composition of formula (I). This is due to the fact that in such cases a very pure $\epsilon$ phase can be obtained, as demonstrated by FIG. 9.

Figures 10A, 10B:
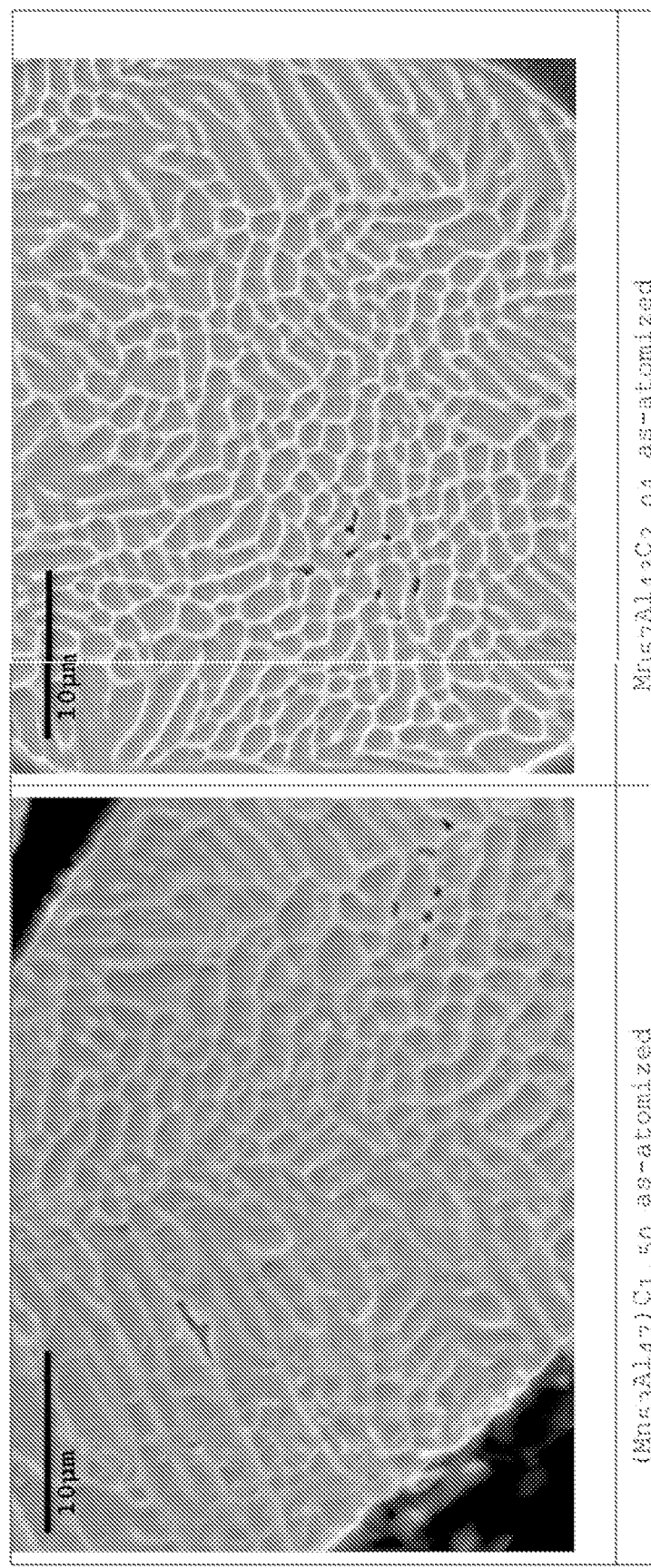
Figures 10C, 10D:
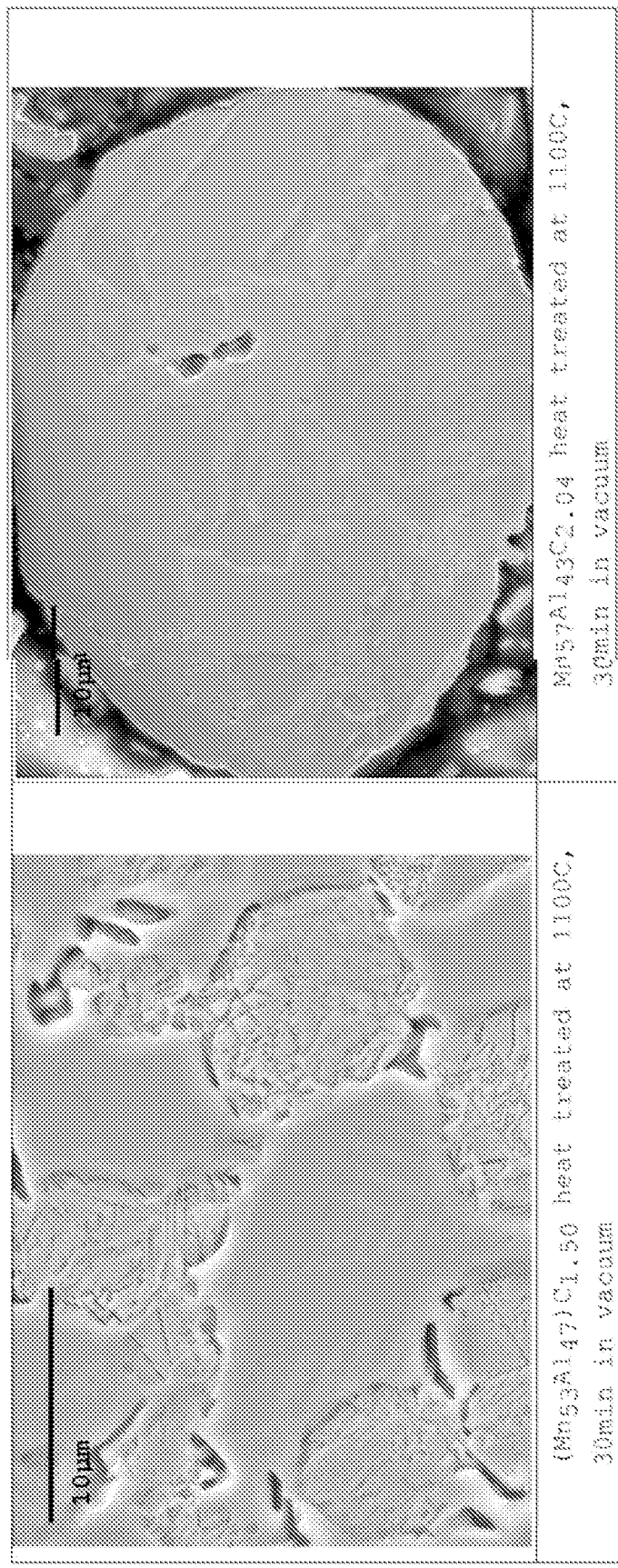

FIG. 9a shows at the top the diffractogram (XRPD) of a sample having the composition $Mn_{53}Al_{47}C_{1.50}$, and at the bottom of a sample having the composition $Mn_{57}Al_{43}C_{2.04}$, both directly after gas atomization under identical conditions. As can be seen from the XRPD data, the sample at the top falling within the scope of formula (II) shows a reasonably good purity, yet some impurities ($\gamma2$, $\beta$) are also present as derivable from the minor peaks around 42-43° in 2θ. Such peaks are also present in the alloy having a composition of formula (I) shown in the lower part, yet to a lesser extent. Interesting to note is also the similarity of the grain-matrix structure, as represented by the SEM pictures shown in FIGS. 10a and b. Notably, the difference in composition between the grains and the matrix is smaller for the alloy in accordance with formula (I). This is reflected in the microstructure after high temperature treatment, as illustrated in FIGS. 10c and d.

While thus step a. leads to a good product in terms of homogeneity and purity of the $\epsilon$ phase when an alloy having a low Mn content is used, an even better product is obtained when step a. is conducted on an alloy of formula (I) having a high Mn content of 56 to 59 (relative to Al and Mn being 100).

However, even a material that does not conform to formula (I) can subsequently be transformed to a material having good magnetic properties and a high content of $\tau$ phase, by a suitable heat treatment at 500 to 700° C., preferably 550-650° C. for a suitable time, such as 0.5-10 hours, preferably 1 to 5 hours, such as 2-4, e.g., 3 hours. This is illustrated in FIG. 9b, showing the respective XRPD diagrams after 3 hours at 650° C. This step is again preferably conducted under vacuum or under inert gas, such as argon. The microstructure after such treatment is very similar to the microstructure achieved directly after atomization (FIGS. 10a and b).

As shown in FIG. 9b, the material at the top having the composition $Mn_{53}Al_{47}C_{1.50}$ has a high purity of $\tau$ phase of about 87%. The magnetization at 9 T was 112 emu/g at 9 T, which is a very good value.

Conversely, the material of formula (I) shown at the bottom of FIG. 9b having the composition $Mn_{57}Al_{43}C_{2.04}$ shows actually a lower purity of the $\tau$ phase, even though the starting material had a higher purity of the $\epsilon$ phase. This is also reflected in the magnetic properties, as the sample had still a good, but slightly lower magnetization of 109 emu/g at 9 T.

A heat treatment at 500-700° C. for a suitable time, such as 0.5-10 hours, is thus able to convert a material having a lower purity of $\epsilon$ phase after gas atomization into a material having actually a higher purity (and/or quality) of the $\tau$ phase. In consequence, the present invention also includes an embodiment of the method for producing an alloy wherein gas atomization step a. is conducted for an alloy of formula (II) wherein x' is less than 56, e.g. 55.8 or lower but 50 or higher, preferably 54.5 or lower and 52.0 or higher, y' is higher than 44 but 50 or lower, preferably 45.5 or higher and 48.0 or lower (with x'+y'=100), and z' is 1.70 or less and 0.10 or more, preferably 1.50 to 0.80, followed by a heat treatment 500 to 700° C., preferably 550-650° C. for a suitable time, such as 0.5-10 hours. This allows obtaining a material rich in $\tau$ phase and having a magnetization of 110 emu/g (at 9 Tesla) or higher.

The particle size of the powders obtained by the gas atomization process is not particularly limited and can be adjusted by selected the appropriate conditions. Typically, the powders obtained from the gas atomization process have a particle size (or particle diameter) D50, as determined by a laser light scattering method, of 200 μm or less, preferably 150 μm or less, and more preferably in the range of 30-80 μm.

If desired, the material obtained from step a. may optionally be subjected to a further micronization treatment. This could for instance include a ball milling, e.g., the cryo milling of step c.

Step b.

In step b., the alloy of formula (II) (and preferably the alloy of formula (I)) is subjected to a heat treatment at 900-1200° C. This step is again preferably conducted under vacuum (i.e., at a pressure of less than 100 Pa, more preferably 10 Pa or less, such a 1 Pa or less), or under inert gas atmosphere, such as under argon.

It has been found that such a step b. is able to transform the ε phase into the τ phase. In consequence, the starting material for step b. is preferably an MnAl alloy of formula (I) that contains ε phase. More preferably, the content of the ε phase as determined by XRPD is 80% or more, more preferably 85% or more. For reference, the purity according to XRD/Rietveld is for FIG. 9a (bottom) about 86.7% sand for FIG. 9c (bottom) ca 84.7% τ, showing that essentially all of the ε phase is transformed into the τ phase.

Step b. may also minimize structure defects, such as APB (antiphase boundary) defects and the presence of twinned crystals, which are expected to impair the magnetic properties. In consequence, the τ phase resulting from step b. can show high crystal structure quality and can exhibit excellent magnetic properties.

The duration of the heat treatment in step b. depends on the size and shape of the alloy sample that is subjected to the treatment. It is easily recognizable that large lumps or ingots may require more time for the temperature to reach the interior thereof as compared to powders. In addition, larger segregates (i.e., large volume regions of compositional differences) require more time to minimize compositional gradients and homogenize microstructure because of the long range atomic diffusion that is necessary. A too long heat treatment time at 900 to 1200° C. might however possibly be disadvantageous, as further reactions might occur. In consequence, it is preferred to conduct step b. on alloy of formula (II) or (I) that are present in the form of particles. The particles have preferably a diameter D50 of 5000 μm or less, more preferably 1000 μm or less, further preferably 500 μm or less, still further preferably 100 μm or less or less, such as in the range of 10 to 100 or 15 to 80 μm. Herein, the value of D50 defines that 50% by weight of the particles have the indicated size or smaller, as determined by a laser light scattering method.

For particles having a such a particle size, a heat treatment time at 900 to 1200° C. of 5 hours or less is generally sufficient, and the heat treatment time can also be 3 hours or less or 2 hours or less, such as 90 minutes or less, or even 45 minutes or less or 30 minutes or less. The minimum time is 2 minutes, but can also be 5 minutes or more or 10 minutes or more, such as 20 minutes or more, e.g., 21 minutes or more. In the present invention, the heat treatment time of step b. is defined as the time span from the heat-up when the alloy temperature reaches 900° C. to the time when the temperature drops below 900° C. This time thus represents the dwell time within this temperature range from 900 to 1200° C.

The heat and cool rates are not particularly limited but may be chosen appropriately in order to avoid formation of γ2 and β phases. While high (or low) heating rates at lower temperatures (i.e. below 500° C., 600° C. or even below 650° C.) are not considered to be particularly disadvantageous as no major effects are expected at these temperatures, the temperature increase and decrease rates within the temperature range of from 600 (or 650) to the lower limit of 900° C. of step b. is preferably from 5° C./min or higher, more preferably 10° C./min or higher, and preferably 30° C./min or less, more preferably 25° C./min or less, such as within the range of 15° C./min to 20° C./min.

The temperature within the range of 900 to 1200° C. can be kept constant for a certain time, such as for 5 minutes or more. It is however also possible to provide for a temperature profile containing heating and cooling segments within the range of 900 to 1200° C. An exemplary temperature profile is shown in FIG. 7.

Step b. can be performed with any alloy of formula (II) comprising ε phase, but is preferably performed with an alloy of formula (I). Further, step b. is preferably performed for an alloy comprising ε phase in particle form as defined above, and further preferably is performed with an alloy comprising ε phase in particle form obtained by gas atomization in accordance with the above step a. Yet, as outlined above, it is also possible to produce an alloy containing ε phase by both gas quenching and water quenching. Gas-quenched (as example 2) gives lower oxygen amount (<0.03 wt % O) which is beneficial, however, water-quenched cooling (using e.g., degassed distilled water) could improve cooling rate and thus give higher ε-phase purity (<0.5 wt % O). However, the lower quenching rate for gas-quenched powders may be compensated with a higher melt temperature, which decrease melt viscosity and atomized particle size and, thus, increases the quenching rate.

Most preferably, step b. is conducted on an alloy of formula (I) in particle form obtained by gas atomization in accordance with the above step a. In all these embodiments, the content of the ε phase is preferably 80% or more, more preferably 85% or more (as determined by Rietveld methods on X-ray diffractograms).

The reason why step b. is preferably conducted for an ε phase containing alloy of formula (I) having a relatively high carbon and manganese content is that in particular for such compositions the effect of forming the τ phase is prominent, and thereby an alloy having extremely beneficial properties can be obtained. This is illustrated in FIG. 9c.

FIG. 9c shows at the top the XRPD diagram of the sample having the composition $(Mn_{53}Al_{47})C_{1.50}$ (Example 2-B6) and at the bottom of the sample having the composition $(Mn_{57}Al_{43})C_{2.0}$ (Example 2-A2), respectively, after gas atomization (ε phase, XRPD shown in FIG. 9a) and subsequent heat treatment at 1100° C. for 30 minutes (heat rate and cooling rate up to 1100° C.: 10° C./min, vacuum). SEM images of the two materials after this heat treatment are shown in FIGS. 10c and d.

As derivable from a comparison of FIG. 9c with FIG. 9b, the sample having a low Mn content with the composition $(Mn_{53}Al_{47})C_{1.50}$ shows somewhat higher purity of the τ phase and somewhat better magnetic properties after a heat treatment at 650° C. for 3 h under argon (FIG. 9b, top $(Mn_{53}Al_{47})C_{1.50}$): purity ca. 87%, magnetization 112 emu/g at 9 T; bottom $(Mn_{57}Al_{43})C_{2.0}$) purity ca. 84%, magnetization 109 emu/g at 9 T). This is observed despite the fact that the purity of the ε phase of $(Mn_{53}Al_{47})C_{1.50}$ as obtained after gas atomization is lower (see FIG. 9a, top: $(Mn_{53}Al_{47})C_{1.50}$, bottom: $(Mn_{57}Al_{43})C_{2.0}$)).

Yet, for a heat treatment b. at 900-1200° C., the situation is actually reversed, as shown in FIG. 9c. Here, the sample having a low Mn content ($(Mn_{53}Al_{47})C_{1.50}$), x' in formula (II)=53) lead to a lower purity of the τ phase of ca. 70%, and the SEM picture (FIG. 10c) shows severe compositional segregation with high content of impurity phases (β, γ2) at mainly the grain boundaries. This is reflected in less favorable magnetic properties, giving a magnetization of 86 emu/g at 9 T. Conversely, the sample of formula (I) having a high Mn content (($Mn_{57}Al_{43})C_{2.0}$), x in formula (I)=57) exhibited a purity of ca 88% and excellent magnetic properties (magnetization 122 emu/g at 9 T), as well as a more homogeneous microstructure (see FIG. 10d).

In consequence, step b. is applicable to all MnAl alloys of formula (II), yet better results are obtained if step b. is performed for an MnAl alloy also satisfying formula (I).

In consequence, the present invention also includes as one embodiment a method for producing an alloy of formula (II) as defined above wherein
for an alloy having a value of x' of lower than 56, such as 55.8 or lower, and correspondingly a value of y of higher than 44, such as 44.2 or higher, and a value of z' of 1.7 or lower, a heat treatment at 500-700° C. for 0.5-10 hours, as outlined above, is conducted, in order to thereby convert the ε phase into the τ phase, and
for an alloy having a value of x' of 56 or higher and correspondingly a value of y' of 44 or lower, and a value of z' of higher than 1.7, a heat treatment step b. as outlined above is conducted.

The heat treatment step b. is also preferably applied to MnAl alloys satisfying formula (I) that contain ε phase. The starting material for step b. may be a material that is obtained directly after step a., in which case the method of the present invention includes both the steps a. and b. The method comprising step b. is however not limited to methods wherein the starting material for step b. is obtained from step a., and any MnAl alloy of formula (II), and preferably formula (I), containing ε phase can be used as starting material for step b.

The material obtained from step b. containing τ phase may in one embodiment be subjected to a micronization treatment, which may be the following step c. or any other milling procedure. Milling on the relatively soft τ phase can induce relatively more stress and can result in an amorphous state. This may be beneficial for a later recrystallization (and homogenization), e.g., by step d. described below, and may result in better magnetic properties.

Step c.

Step c. is a step of milling an alloy represented by formula (II) at a temperature of −20° C. or below, preferably −100° C. or lower, further preferably −150° C. or lower, and still further preferably −180° C. or lower. This step is herein also referred to as "cryo milling". From a practical standpoint, it is most preferred to conduct the cryo milling at the boiling temperature of nitrogen under atmospheric pressure (−196° C.).

It has been found by the present inventor that conventional milling operations, such as ball milling at room temperature, induce the formation of defects in the crystal structure and lead to deteriorated magnetic properties, in particular saturation magnetization, while leading to an increase in coercivity. Without wishing to be bound by theory, it is believed that the E to T transformation is highly dependent on the nucleation of the τ-phase at the interphase with the ε-phase, and hence, a microstructure with a high surface to volume aspect ratio of both grains and particles may be important in order to promote the τ-phase formation. Results indicate that the rate of formation of τ-phase is much faster from the smaller grained powder than that from coarse-grained ε-phase in the bulk.

The shape and surface morphology of the particles can be controlled by the type of milling technique and processing parameters. An optimal size, spherical shape and smooth surface of the particles may help or facilitate achieving a preferred magnetic alignment of the powders particles, e.g., in a compression tool prior to compaction. Such particles are better designed to respond and rotate more easily to external magnetic fields. The particles will align along the c-axis (easy axis) in a magnetic field. The alignment is preferably performed inside the compaction tool just before and/or during the compression or molding movement. Aligned particles will result in an enhanced remanent magnetization (Mr) of the magnet body, i.e., the magnetization left behind in the body after the external magnetic field has been removed.

It is observed that gas atomized powders are more spherical and have smooth surfaces as compared to water atomized powders. Thus, gas atomized powders are preferred as they may expose a higher degree of smooth spherical surfaces even after a subsequent milling operation. Optionally, milled powders of any synthesis method may be subjected to spherodization methods, e.g., plasma spherodization by Techna® Group.

Hence, the starting material for step c. may be obtained by gas atomization in accordance with step a., to which optionally (and preferably) step b. has been conducted prior to the cryo milling. In this embodiment, the method of the invention comprises the steps a., b., and c., in this order. Yet, step c. can be conducted also on materials of formula (I) or (II) as starting materials that have been prepared via processes not including step a. and/or step b. Preferably, however, the starting material for step c. is an alloy of formula (I) or (II) containing τ phase.

Moreover, milling of brittle materials results in smaller and sharper particles as compared to milling of soft material. On the other hand, milling of soft material will result in relatively larger particles, or even flakes for the same energy input. Milling on softer material often gives smaller grains, a more stressed crystal structure, or even result in an amorphous state. This is a further reason why in one embodiment the method of the present invention comprises a step c. of cryo milling, preferably on an alloy of formula (I) or (II) containing τ phase.

As the hardness of ε-phase is significantly higher than the τ-phase, milling on either phase will have a decisive impact on the final properties. Also, cryogenic milling will make the powder even more brittle and, thus, influence the outcome of the milling in a similar way.

The starting material for step c. can thus be any alloy of formula (II). The starting materials can contain ε or τ phase, preferably in a predominant amount (e.g., more than 50% or 70%, as determined by XRD, see section 1.3), and is in one preferred embodiment a material containing τ phase. For instance, it can be a τ phase containing MnAl alloy of formula (II) or formula (I) that is obtained by a cooling process, with or without any subsequent treatment for increasing the content or purity of the τ phase. It however can also be an ε phase containing MnAl alloy of formula (II) or (I) that is obtained from step a., with or without a further treatment for e.g., purification of the ε phase, such as the gas atomized material obtained from only step a., or a gas atomized material obtained after steps a. and b. have been performed on a MnAl alloy of formula (I) as outlined above. It can also be an ε phase containing material of formula (II) wherein x' is lower than 56, such as 55.8 or lower, and a value of y of higher than 44, such as 44.2 or higher, and a value of z' of 1.7 or lower, on which optionally further a heat treatment at 500-700° C. for 0.5-10 hours, as outlined above, has been performed.

The milling technique can be freely chosen from conventional milling techniques, such as ball milling, jet milling, pin milling etc., or other high shear processes such as hot extrusion. In one embodiment, the cryo milling step employs ball milling at a ball-to-powder ratio (by volume) of 10:1 to 30:1 for a suitable duration, such as 1 to 30 minutes, preferably 2 to 10 minutes.

The milling is preferably conducted under vacuum or under inert gas atmosphere, such as under argon, in order to avoid the formation of oxides. The material is preferably milled to a small particle diameter (expressed as weight D50 and determined by a laser light scattering method) of e.g., 100 μm or less, preferably 50 μm or less, more preferably 30 μm or less, further preferably 10μ or less, still further preferably 5 μm or less, such as 3 μm or less. In order to minimize distortions of the structure and deterioration, the cryo milling is preferably conducted for as short time as possible, but as long as necessary in order to obtain the required particle size and degree of micronization, and/or degree of crystal amorphization, which depends on the hardness of the material and the milling equipment used. For instance, the (cryo) milling is preferably performed for 10 hours or less, preferably for 5 hours or less, and still further preferably for 4 hours or less, but for 30 seconds or more, and often for 1 minute or more.

The powder prior milling could be coated with minor amounts (<0.1% by weight) of an organic substance, such as surfactants or fatty acids such as oleic acid, commonly known as surfactant-assisted milling. Without being bound to any theory, the additive may protect the surfaces for excess oxidation and minimize agglomeration during milling caused by adhesive or electrostatic forces between particles.

Step d.

Step d. is a step wherein a heat treatment on particles of the alloy represented by formula (II) is performed at a temperature of 900 to 1000° C. for a time of 0.5 to 20 minutes, preferably 5 to 15 minutes, more preferably 8 to 12 minutes. This step is also referred to as "flash heating" or "flash heat treatment".

It has been found by the present inventors that the structural distortions that are caused by processing operations such as milling can, at least in part, be reversed and the degree of purity of the τ phase be greatly improved by performing a flash heat treatment step as outlined above on particles of an MnA alloy of formula (II) or formula (I). This so-called "flash heat treatment" allows obtaining an excellent combination of high magnetic saturation and coercivity after the micronization process used for particle formation.

The flash heat treatment d. is preferably performed by first effecting a heating at relatively moderate temperatures at e.g., 200-500° C. in vacuum or reduced pressure to ensure the desorption of water, oxygen, or oxygenated species.

Thereafter, the particles can be heated up further, either in vacuum or inert gases. In this respect, it is preferred to use high heating rates of e.g., 25° C./min or higher, such as in the range of 30-60° C./min, between 600 and 900° C. in order to maximize the time above the temperature at which the ε to τ transition occurs (860-900° C.).

The temperature is then held between 900 and 1000° C. for 0.5 to 20 min, preferably 5 to 15 minutes. It is preferred to keep the time as short as possible, in order to restrict grain growth and sintering of the particles. The suitable time depends also on the surface area, the degree of crystal strain as induced by the shear forces during micronization and the shape of the material, and often 5-10 minutes are sufficient to form the τ phase.

Subsequently, the material is cooled down, typically to room temperature. Again, the dwell time in the temperature range between 600 and 900° C. is again held as short as possible also during cooling, so that the cooling rate is typically also 25° C./min or higher, such as in the range of 30-60° C./min. Minimizing the time in the temperature range between 600 and 900° C. on both heating and cooling allows avoiding or minimizing the formation of impurities, such as β and γ2.

Optionally, the atmosphere pressure at higher temperatures (700° C. or higher) can be increased in order to limit the loss of manganese and thus limit the risk of forming non-magnetic impurities. This can be achieved by increasing the pressure, e.g., nitrogen or argon, at above 1 bar.

The material used for step d. are particles of an MnAl alloy of formula (II) or formula (I). These particles contain at least one of ε and τ phase. The starting material for step d. is thus not particularly limited, and does not need to be a material that is obtained after any of the steps a., b., and/or c. The starting material can however also be a material as obtained after the above step a. only, after the above step b. only, after the above step c. only, after conducting steps a. and b., after conducting steps a. and c., or after conducting steps a., b., and c., in this order. Preferably, the starting material for step d. is an MnAl alloy of formula (II) or more preferably formula (I) that is obtained after steps a., b., and optionally c.

The starting material of step d. is preferably in a size and shape that does not require further processing after step d. The material is thus preferably particles having a small particle diameter (expressed as weight D50 and determined by a laser light scattering method) of e.g., 100 μm or less, preferably 50 μm or less, more preferably 30 μm or less, further preferably 10μ or less, still further preferably 5 μm or less.

By this flash heat treatment step, τ phase is formed. This is shown in FIG. 9d, showing the XRPD data for a sample having the composition $(Mn_{57}Al_{43})C_{2.0}$.

At the bottom of FIG. 9d, the XRPD data of the sample obtained after gas atomization (step a., ε phase), cryo milling (step c., 6 minutes) and flash heat treatment (step d.) is shown. In other words, a cryo milled ε phase was the starting material for the flash heat treatment. As is clearly derivable form the data, the material after flash heat treatment is relatively pure t phase, even though the starting material was mainly ε phase. This material showed a magnetization of 77 emu/g (at 9 T).

At the top of FIG. 9d, the same material is shown, wherein additionally between the steps of gas atomization (step a.) and cryo milling (step c.) a heat treatment for transforming the ε into the τ phase has been conducted (step b.). In other words, a cryo milled τ phase was the starting material for the flash heat treatment. The obtained material after flash heat treatment shows also high purity of the τ phase and a magnetization of 83 emu/g at 9 T.

This shows that a flash heat treatment step in accordance with step d. is able to provide particles having the desired shape (as present in the particles as starting material) having a high content and high quality of τ phase. This represents a major advantage over prior art processes wherein the τ phase was formed prior to further processing steps (e.g., milling), as such processing steps lead to deteriorated properties. With a flash heat treatment step d., however, it becomes possible to obtain a final material having simultaneously the desired shape and good magnetic properties, including magnetization.

The present invention will be described in more detail by way of the following Examples, to which the invention is however not limited.

EXAMPLES

Example 1

1.1. Sample Synthesis

An $Mn_{0.55}Al_{0.45}C_{0.02}$ alloy ingot of 20 g was synthesized by a drop synthesis process starting from a melt at 1400° C., similar to a synthesis method described in H. Fang et al, Journal of Solid State Chemistry 237 (2016) 300-306. The raw materials were all of high purity, using Mn (Institute of Physics, Polish Academy of Sciences, purity 99.999%), C (Highways international, 99.999%) and Al (Gränges S M, purity 99.999%).

First, Aluminum was heated and melted with carbon black in an alumina crucible at 1000° C. after the atmosphere was evacuated and high vacuum established (<0.001 bar). Small pieces of Mn metals were subsequently dropped into the melt of Al and C, then the eddy current power was increased to enable the Mn pieces to react with Al—C liquid immediately. The melt was kept at 1400° C. for 10 minutes to ensure that the Mn—Al—C liquid forms a homogeneous alloy solution.

The Mn—Al—C alloy was cooled down to room temperature by cooling the ingot in vacuum over a water-cooled Cu plate. The achieved cooling rate allows the alloy to form τ-MnAl of high purity directly. The resulting material is in the following also referred to as "drop synthesized" material.

1.2. Cryo Milling Process

Cryogenic milling was performed at liquid nitrogen temperatures (–183° C.) using a SPEX Freezer/Mill® 6770. The starting material prepared above was placed in a stainless steel vial with a stainless steel cylindrical impactor. The mass ratio between the impactor and the powder was 30:1. Before the milling was started, the vial was allowed to cool down for 30 min in the liquid nitrogen bath of the Freezer/Mill®. The milling was then carried out at an impact frequency of 30 Hz for a total of 2 (CM2) or 4 hours (CM4). Each milling run consisted of 5 minutes milling and 3 minutes pause cycles.

A smooth spherical particle shape is easiest to align along the easy magnetization axis in a magnetic field. Cryo milling allows obtaining particles that may undergo such an easy alignment, as it does not lead to the formation of sheet-like particles with random orientation as was observed when milling is performed at ambient temperatures (see e.g. H. Jian et al, "Microstructure and magnetic properties of Mn—Al—C alloy powders prepared by ball milling" Journal of Alloys and Compounds 622 (2015) 524-428, or Z. Liu et al Structure and Properties Evolutions for Hard Magnetic MnAl and MnGa based Alloys prepared by Melt Spinning or Mechanical Milling, Mater. Sci. Eng. Adv. Res 1(1) 12-19). The smooth and spherical particle shape obtained by cryo milling was confirmed by visual inspection of particles obtained after 2 hours and 4 hours cryo milling using SEM imaging. Here, it was confirmed that the average particle size of the particles remained about 20 μm after 2 and 4 hours cryo milling, respectively. The surface smoothness increased somewhat at longer milling times.

1.3. Diffraction Studies

X-ray powder diffraction (XRD) was performed at a Bruker Twin-Twin diffractometer, with a Cu double Kα radiation ($\lambda1$=1.540598 Å, $\lambda2$=1.544390 Å). The neutron powder diffraction was carried at JEEP-II reactor of IFE (Institution for Energy) at Kjeller, Norway. The neutron diffraction patterns were detected by a high pressure neutron diffractometer. The crystal structure and phase analysis were treated by Fullproof™ software through the Rietveld method as described in H. Rietveld "A profile refinement method for nuclear and magnetic structures", J. Appl. Crystal. 2(2) (1969). The peak shape of the diffraction pattern was characterized by the Thompson-Cox-Hastings pseudo-Voigt function.

The phase transition behaviors of 2 (CM2) and 4 (CM4) hours cryo milled $Mn_{0.55}Al_{0.45}C_{0.02}$ samples when heated and cooled at different rate was investigated by in situ synchrotron X-ray diffraction at the P02.1 beamline at PETRA III ($\lambda$=0.207 Å). The powder cryo milled $Mn_{0.55}Al_{0.45}C_{0.02}$ samples were loaded in a single crystal sapphire tube, the tube was wounded by Kanthal wire and heated up to 900° C. in vacuum (50° C./min), dwelled at 900° C. for 5 minutes, then cooled (50° C./min) to room temperature. The temperature was monitored by a K Type thermocouple insert from one side of the sapphire tube with close contact to the sample. The sample to detector distance and X-ray beam wavelength was determined and calibrated by the NIST LaB6 standard sample. The X-ray diffraction patterns were recorded by a PerkinElmer XRD1621 fast area detector. The diffraction patterns of 2D pictures were transformed to 1D diffractograms by the Fit2D™ program.

1.4. Flash Heating

For the flash heating process, samples were first put into $Al_2O_3$ crucibles, the crucibles were sealed in evacuated quartz tubes. Then, the ampoules were transferred to a pre-heated resistance furnace and "flash heated" at 900° C. for a total time of 1 minutes, 5 minutes, and 15 minutes respectively, followed by cooling the ampules in ambient air.

1.5. Magnetic Properties Characterization

Powder samples were placed in gelatin capsules with varnish. The capsule and varnish together contribute a paramagnetic moment at 300 K and account for <0.01% of the saturation magnetic moment at 9 T. Samples were measured in a Physical Properties Measurement System (PPMS) from Quantum Design equipped with a 9 T superconducting magnet or a MPMS from Quantum Design. Magnetization in SI units and μB were calculated from the sample weight and using the lattice parameters obtained from the XRD/NPD refinements.

1.6 X-Ray and Neutron Powder Diffraction

The refined powder diffraction data of as-synthesized (FIG. 3a/b), 2 h cryo milled (2 CM, FIG. 3c/d) and 4 h cryo milled (4 CM, FIG. 3e/f) samples are shown in FIG. 3.

From the XRPD data (FIG. 3a, c, e) a clear decrease in the peak intensities combined with a pronounced peak width broadening is observed with longer milling time. In addition, several of the weaker peaks (i.e., 1.73, 2.27 and 3.47 $Å^{-1}$) related to the τ-phase (i.e., the (001) and the (100) and the (002) planes), gradually disappears with longer milling time. However, the remaining strong reflections (i.e., between 2.7 $Å^{-1} \leq Q \leq 3.5$ $Å^{-1}$) from XRPD indicate that a crystalline phase is still preserved. On the contrary, the NPD data (FIG. 3b, d, f) show a strong decrease of the reflection intensities for the 2 CM sample, while no reflections are observed for the 4 CM sample (FIG. 3f), reminiscence of an amorphous phase.

The combined XRPD and NPD data (FIG. 3) of the DS, 2 CM and 4 CM samples were used to refine the lattice parameters in the space group P4/mmm. The NPD data was, however, not refined for the 4 CM due to the lack of peaks. From Table 1 with data obtained from the Rietveld refinement of the combined XRPD and NPD data, the occupancy of the Mn and Al-sites are found to vary with increased milling time. It is found that the Mn content at the Mn 1a (0, 0, 0) site decreases from 94% to 75%, while the Al content increases from 6% to 25% after 2 hours of cryo milling. The opposite is observed at the Al 1 d (½,½,½) site, where the Al content decreases from 85% to 66% after 2 hours of cryo milling (Table 2).

Figure 1:
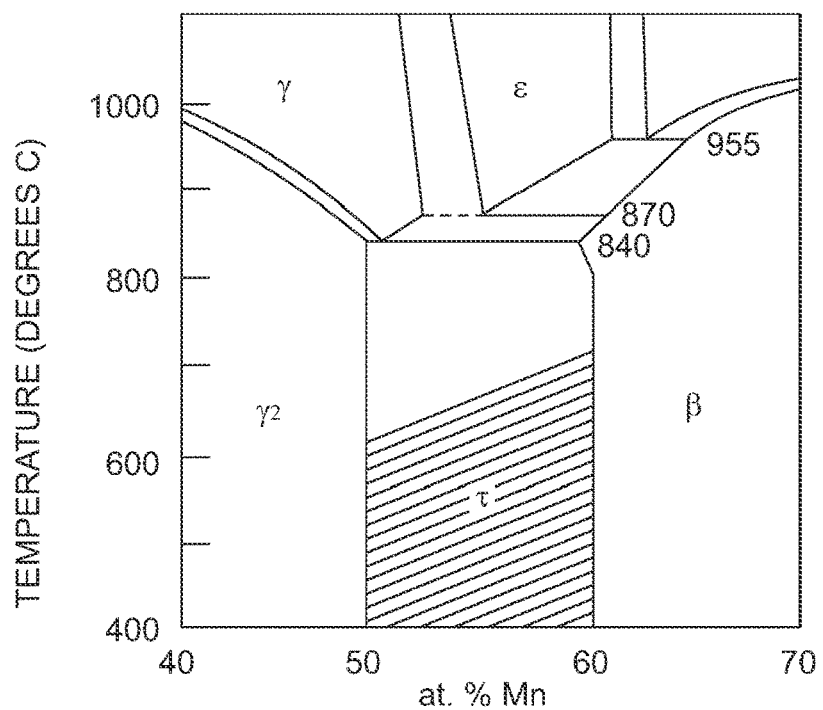
FIG. 1 Selected part of the phase diagram of the system Al—Mn
Figure 2:
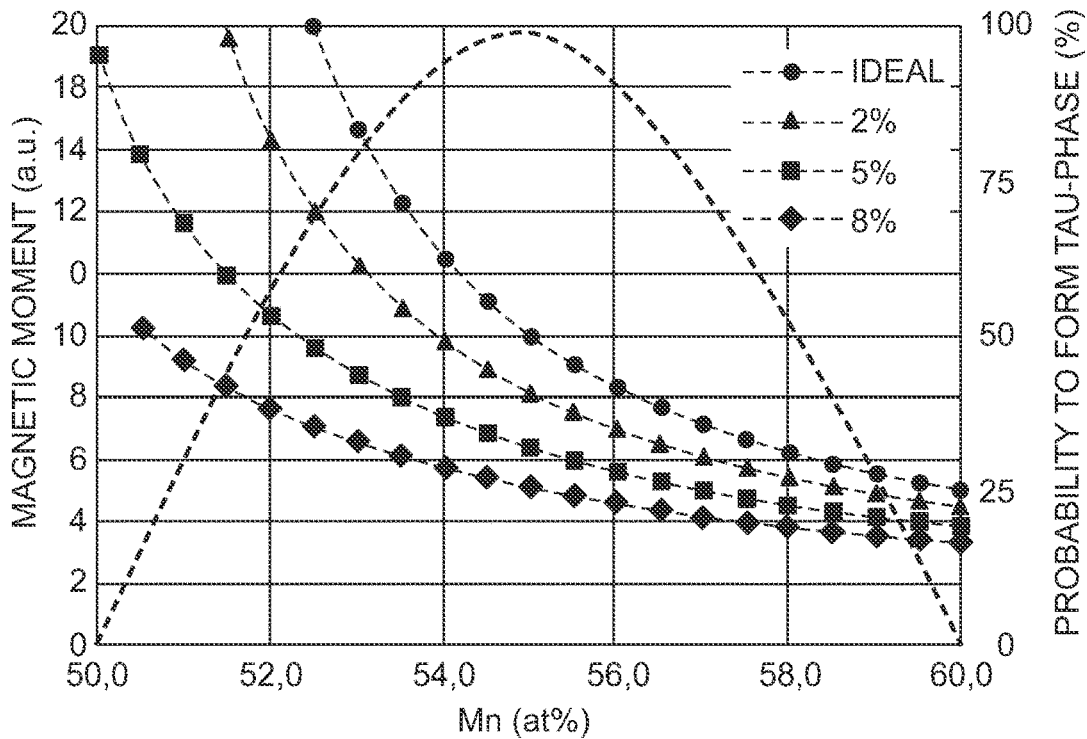
FIG. 2 Schematic diagram showing the relationship between theoretical magnetic moment and manganese content, with ideal occupation of lattice positions by Mn and Al (circles), 2% misplacement of Al sites by Mn (triangles), 5% misplacement of Al sites by Mn (squares) and 8% misplacement of Al sites by Mn (diamonds).
Figure 3A:
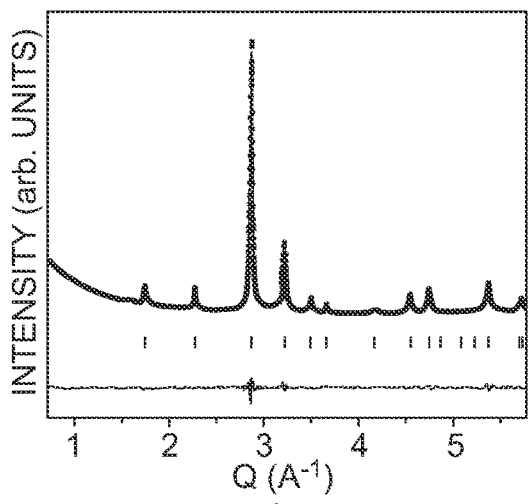
Figure 3B:
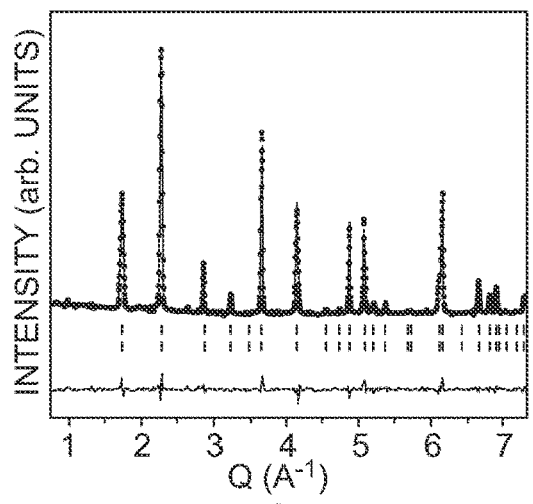
Figure 3C:
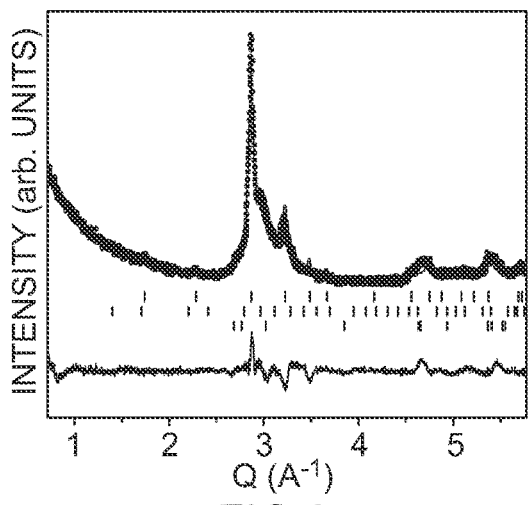
Figure 3D:
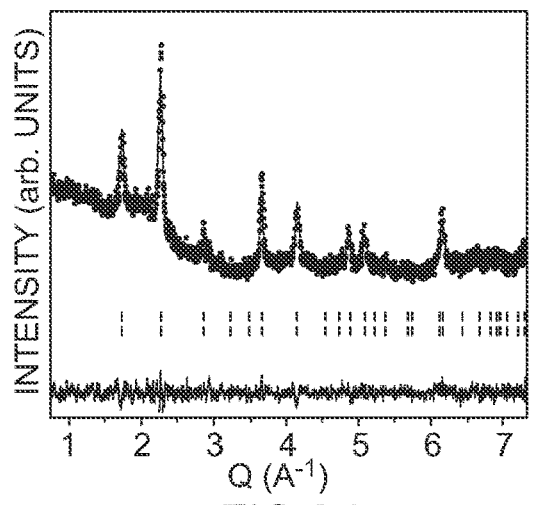
Figure 3E:
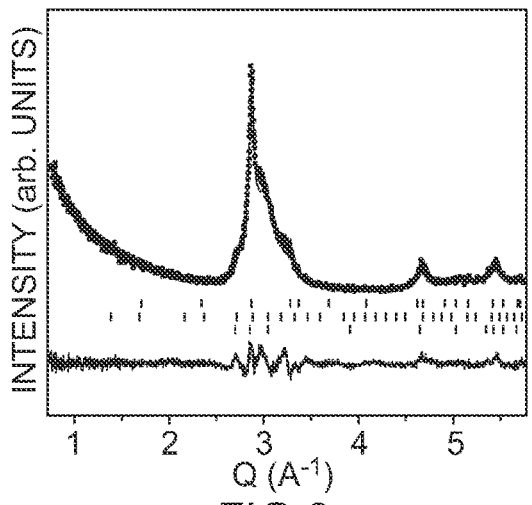
Figure 3F:
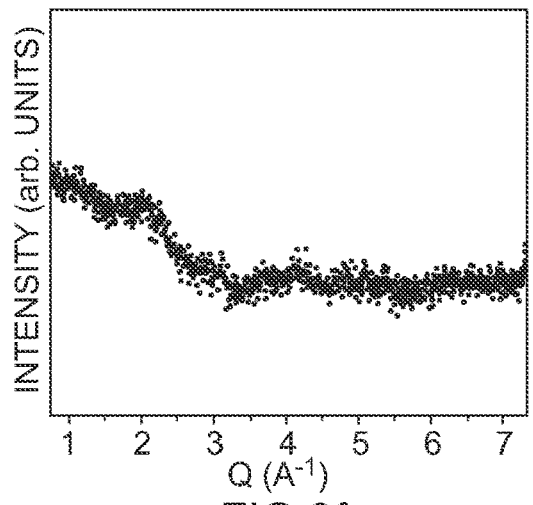

FIG. 4 shows refined XRPD patterns of the flash heated 2 CM and 4 CM powders. It is clearly observed that the flash heating process recrystallizes the powder significantly after only 5 min (FIG. 4a, c) to produce peaks comparable to the original DS sample (FIG. 3a).

All the XRPD patterns for the flash heated samples contain detectable amounts of the γ2-phase (FIG. 4) that are mainly observed ~3 Å$^{-1}$, but the amount of these phases is quite low (<10%). The structural model with the same Mn and Al occupancies as in the DS sample indicates that a reordering of the Mn and the Al on the two crystallographic sites takes place upon the heat treatment (Table 1).

TABLE 1

Refined atomic occupancies for the DS, 2CM, 4CM and the flash heated samples

| Sample | Atom | Site occupancy 1a(0, 0, 0)(%) | Site occupancy 1d(½, ½, ½)(%) |
|---|---|---|---|
| DS | Mn | 94.8 | 14.5 |
| | Al | 5.2 | 85.4 |
| 2 hours CM | Mn | 75.4 | 33.5 |
| | Al | 24.6 | 66.4 |
| 4 hours CM | Mn | N/A | N/A |
| | Al | N/A | N/A |
| Flash treated | Mn | 94.8 | 14.5 |
| | Al | 5.2 | 85.4 |

The above results show that the flash heating process of the present invention is able to re-form the τ phase, even after processing steps such as milling that lead to a loss of the previously present τ-phase. These results are also in agreement with the XRPD and NPD patterns shown in FIGS. 3 and 4, where FIG. 4 shows the refined XRPD of cryo milled and flash heated samples; FIG. 4a) 2 hours cryo milled and 900° C.+5 minutes flash heated; FIG. 4b) 2 hours cryo milled and 900° C.+15 minutes flash heated; FIG. 4c) 4 hours cryo milled and 900° C.+5 minutes flash heated; FIG. 4d) 4 hours cryo milled and 900° C.+15 minutes flash heated).

To further investigate the stability range of the τ-phase as a function of heating rate and temperature, the 2 CM sample was analyzed in situ by synchrotron radiation (λ=0.207 Å). During the measurement, the powder was subjected to a heating rate of 50° C./min from room temperature up to 920° C. and was kept for 5 minutes before being cooled down to room temperature again, with a rate of 50° C./min. It was observed that the 2 CM powder decomposes into a mixture of ϑ-phase and τ-phase at ~500° C. At T>900° C. the powder transforms fully into pure ε-phase. However, during the cooling process at a cooling rate of 50° C./min, pure τ-phase is reformed again at T<830° C.

The effect of the cryo milling process on the magnetic properties (i.e., Hc and Ms) was evaluated from magnetization versus magnetic field measurements. From the magnetic hysteresis loop of the DS sample (cf. FIG. 5a) the coercive field is obtained as μ0Hc≈40 mT, while the value of the saturation magnetization Ms≈-614.8 kA/m is close to the theoretical maximum of the magnetization. Furthermore, the effect on the magnetic properties from cryo milling followed by flash heating (1 min, 5 min and 15 min) is illustrated by the M-H measurements of 2 CM and 4 CM in FIG. 5b,c,d.

Overall, the magnetization decreases significantly with increasing milling time. After 1 min of flash heating at 900° C., the Ms for 2 CM and 4 CM only recovers to ~40% and ~19% of the original DS sample. The Hc is, however, ~475% and ~750% higher than the original DS sample, respectively (see Table 2). Further increase of the flash heating time from 1 min to 5 min at 900° C. results in an Ms value ~88% and ~84% of the DS sample for the 2 CM and 4 CM samples, respectively. The Hc values for the 2 CM and 4 CM samples are however, only ~200% and ~300% higher than the original DS sample after 5 min of flash heating at 900° C. Moreover, heating for 15 min only resulted in minor changes as seen in Table 2.

TABLE 2

Influence of cryo milling and flash heating on magnetic properties of drop-synthesized (DS), cryo milled (CM) and cryo milled and flash heated (fh) samples

| Material | $M_s$ (kA/m) | $M_s$ ($μ_B$/f·u) | $M_r$ (Am²/kg) | Mr/Ms (%) | $μ_0H_c$ (mT) |
|---|---|---|---|---|---|
| DS | 614.8 | 1.83 | 23.6 | 19.6 | 40 |
| CM 2 h | 104.5 | 0.31 | 7.34 | 35.9 | 380 |
| CM 2 h (1 min fh) | 248.4 | 0.74 | 15.9 | 32.8 | 230 |
| CM 2 h (5 min fh) | 542.5 | 1.61 | 26.2 | 24.7 | 120 |
| CM 2 h (15 min fh) | 527.9 | 1.58 | 25.9 | 24.9 | 130 |
| CM 4 h | 29.8 | 0.09 | 1.33 | 22.8 | 50 |
| CM 4 h (1 min fh) | 117.6 | 0.35 | 8.21 | 35.5 | 340 |
| CM 4 h (5 min fh) | 515.8 | 1.53 | 29.1 | 28.8 | 160 |
| CM 4 h (15 min fh) | 515.2 | 1.53 | 28.0 | 27.7 | 150 |

From the magnetic properties of the DS sample, the Ms value ~614.8 kA/m (~120.5 Emu/g) reach nearly the theoretical limit 676.4 kA/m for, indicating that the E to t transformation is nearly complete. Yet, the Hc value is low at 40 mT, which may not be sufficient for many industrial application. Notably, Hc is greatly increased by cryo milling, and the cryo-milled and flash-heated material shows both good Ms and Hc. This shows that the combination of cryo milling, and flash heating allows obtaining a material that has both sufficient Ms and Hc, while beneficial effects are also observed for cryo milling alone (increase of Hc) and flash heating (restoration of the τ phase, i.e., increase in Ms close to that of the untreated DS material). Without wishing to be bound by theory, it is believed that the flash heating (besides minimizing impurities such as β and γ2 phases) re-orders the Mn and Al in the crystal lattice and is in particular effective to heal defects in this ordering that have been induced by the milling procedure.

Example 2

2.1 Synthesis

First, aluminum metal (Stena Aluminium AB, Sweden, >97 wt %) was melted together with graphite (Carbomax AB, Sweden, >98.5 wt %) at a melt temperature of about 1100° C. in an argon atmosphere. Thereafter, the manganese metal (Manganese metal company Ltd, SA, >99.7 wt %) was added and the melt temperature was adjusted to 1400° C. and held there for 5 minutes prior to gas atomization under an argon atmosphere at a pressure of about 19 bar. This caused a rapid cooling of the gas-atomized particles to form ε-MnAl alloy of high purity and low oxygen content (ca 0.03 wt % for gas-quenched). The raw materials were carefully adjusted to give the compositions of the samples presented in Table 3.

2.2 Milling

The gas-atomized particles were then milled using an MM 400 mixer mill (Retsch GmbH) capable for dry, wet, or cryogenic grinding, optionally under argon atmosphere. A 50 mL hardened steel vial, 25 mm balls and an impact frequency of 30 Hz for 6 min with 15:1 ball-to-powder ratio were used.

The powders were prior coated with 0.02 wt % oleic acid (as applied by acetone that was allowed to vaporize prior milling). Before the cryo-milling was started, the sealed vial was allowed to cool down for 30 min in a bath of liquid nitrogen. Between each 3 min of milling the vial was let to cool down again for 15 min. The cry milling was performed under the conditions outlined in section 1.2 above.

2.3 XRD Measurements

XRD measurements were performed using a Panalytical X'Pert Pro PW3040 Multi Purpose Diffraction system equipped with X-Celerator solid state line detector. Experimental data were processed using Panalytical B.V. X'Pert HighScore Plus software, version 4.0. The measurement conditions were Cu Kα 0.15406 nm, accelerating voltage 45 kV, current 40 mA, Ni-filter, 2θ-scan range: 20-100°, divergence slit 0.5, time 30 min. The quantitative analysis by refinement of the phases was performed manner as described above in section 1.3.

2.4 Magnetic Measurements

The samples were characterized with respect to their magnetic characteristics with a LakeShore 7400 VSM (maximum applied field 1.8 T) and a Quantum Design PPMS (maximum applied field 9 T). Samples were placed in gelatin capsules and fixed with a weakly paramagnetic varnish (<0.01% of the moment at 1.8 T). A density of 5100 kg/m3 was assumed.

2.5 Differential Scanning Calorimetry (DSC)

The melting and cooling behavior of the powders were measured with a Simultaneous Thermal Analysis instrument (TGA & DCS) from Netzsch (Jupiter STA 449 F3); method 10° C./min to 1250° C. in argon gas, sample size ca 40 mg.

2.6 Scanning Electron Microscopy (SEM)

Particle samples were mounted in fina met with added carbon CFU-4 and bakelite PhenoCure™, grinded and polished down to 1 μm by standard process. It was polished with OPS-S Non-drying colloidal silica suspension for 5 minutes in order to improve planeness. The sample was subsequently etched in a diluted modified Keller's reagent: with HCl 6 ml, HNO$_3$ 3 ml, HF 1 ml and H$_2$O 290 ml. A thin layer of Au was sputtered on the surface to improve surface conductivity. Sample was analyzed in a Field Emission Scanning Electron Microscopy (FE-SEM) Hitachi SU6600 equipped with an Electron Discharge Spectroscopy (EDS) system (Bruker EDX XFLASH 5010).

2.7 Heat Treatment

A high temperature treatment as applied on as-synthesized powders or pieces, either in vacuum or argon. The temperature profile is shown in FIG. 7.

2.8 Flash Heat Treatment on Milled Powders

The flash heat treatment was performed in a sealed tube furnace (L 50 cm, ø4 cm; Entech AB) using the temperature profile shown in FIG. 8. First, the sample was degassed by repeatedly filling with argon and vacuum, and then the temperature was allowed to increase slowly in vacuum (10° C./min). The vacuum was maintained at 350° C. until low and stable pressure was reached. In a second stage, the temperature was increased rapidly to 950° C. (>40° C./min) to perform a "flash treatment". The time above 900° C. was adjusted to about 8 minutes, followed by rapid cooling to ambient temperature. In the second stage the atmosphere was either vacuum or argon.

Following the synthesis scheme above, the following samples were prepared and subjected to DSC analysis:

TABLE 3

Example Compositions and DSC data

| Example | Composition | Mn/C-ratio | Complies with Formula (I) | Peak 1 Position (° C.) | Peak 1 Area (J/g) | Peak 2 Position (° C.) | Peak 2 Area (J/g) | Total Peak Area (J/g) |
|---|---|---|---|---|---|---|---|---|
| 2-B1 | $(Mn_{54}Al_{46})C_{0.76}$ | 70.6 | No | 786.9 | 20.5 | 862.1 | 3.0 | 23.5 |
| 2-B2 | $(Mn_{54}Al_{46})C_{0.76}$ | 71.7 | No | 792.4 | 24.4 | 845.0 | 3.9 | 28.3 |
| 2-B3 | $(Mn_{52}Al_{48})C_{2.36}$ | 22.2 | No | — | — | 858.8 | 14.8 | 14.8 |
| 2-B4 | $(Mn_{53}Al_{47})C_{1.58}$ | 33.2 | No | 786.4 | 21.7 | 8660. | 2.9 | 24.6 |
| 2-A1 | $(Mn_{59}Al_{41})C_{2.05}$ | 28.6 | Yes | 787.7 | 53.4 | — | — | 53.4 |
| 2-B5 | $(Mn_{61}Al_{39})C_{2.22}$ | 27.5 | No | 791.3 | 69.6 | — | — | 69.6 |
| 2-A2 | $(Mn_{57}Al_{43})C_{2.04}$ | 27.8 | Yes | 786.8 | 43.1 | — | — | 43.1 |
| 2-B6 | $(Mn_{53}Al_{47})C_{1.50}$ | 35.4 | No | 785.2 | 22.1 | 865.5 | 1.9 | 24.0 |
| 2-B7 | $(Mn_{55}Al_{45})C_{1.01}$ | 54.7 | No | 788.5 | 25.8 | 850.7 | 2.9 | 28.7 |
| 2-B8 | $(Mn_{55}Al_{45})C_{0.45}$ | 122.1 | No | 800.0 | 20 | 830.7 | 10.1 | 30.1 |
| 2-B9 | $(Mn_{57}Al_{43})C_{1.19}$ | 47.8 | No | 787.2 | 19.9 | 857.4 | 3.2 | 23.1 |
| 2-B10 | $(Mn_{55}Al_{45})C_{1.24}$ | 44.0 | No | 786.4 | 9.0 | 852.6 | 8.4 | 17.4 |
| 2-B11 | (Mn59Al41)C1.32 | 45.0 | No | 796.3 | 76.8 | — | — | 76.8 |
| 2-B12 | (Mn59Al41)C1.33 | 44.0 | No | 794.7 | 68.0 | — | — | 68.0 |
| 2-B13 | (Mn56Al44)C0.96 | 58.8 | No | 790.6 | 52.5 | — | — | 52.5 |
| 2-A3 | (Mn57Al43)C2.14 | 26.4 | Yes | 788.7 | 45.7 |  |  | 45.7 |
| 2-A4 | (Mn56Al44)C2.18 | 25.8 | Yes | 792.1 | 51 | — | — | 51.0 |

Of the above samples, those named "2-B" do not comply with formula (I) as defined in claim 1. while those named "2-A" comply with formula (I).

FIG. 6 shows exemplary DSC graphs of materials as synthesized above (FIG. 6a: Example 2-B1, FIG. 6b: Example 2-A3). The exothermic peaks at about 450–550° C. represent the martensitic transition from ε-phase to τ-phase. At about 780–870° C. the ε-phase reforms, and at ca 1170° C. to 1240° C. the melting of the alloy starts.

The total area of the peaks between 780–870° C. correlates with the amount of carbon-stabilized τ-phase, and the total area covered by this/these peak(s) is indicated in the table above in J/g. Here, a higher area value represents a higher amount of carbon-stabilized τ-phase. However, in alloys containing up to 55% Mn, only up to 1.7% of carbon can be dissolved. Increasing the amount of Mn allows increasing the amount of carbon, which in turn leads to a greater stability of the τ phase. Further, the carbon-stabilized τ-phase is only stable for further processing (milling and heat treatment) if the Mn/C-ratio is close to 28 (in the range 26~33). i.e., a carbon-saturated or close to carbon-saturated τ-phase.

It is apparent that a higher stability of the τ phase. i.e., higher peak area in combination with a carbon-saturated τ-phase (Mn/C-ratio preferably between 28~30), could be obtained when the requirements of formula (I) are met.

Further, it is apparent from the results above that the alloys in accordance with formula (I) show only one peak in the DSC in the temperature range of 780-810° C. (or 780-800° C.), denoted as Peak 1. This indicates a higher homogeneity of the τ phase, as only one apparent transition back to the ε phase is observed.

The following additional observations were made, illustrating that adjusting the composition of the alloy in accordance with formula (I) and adjusting the Mn/C ratio is of importance:

Sample 2-B3 (($Mn_{52}Al_{48}$)$C_{2.36}$) has a high amount of carbon and low amount of Mn. This sample contained a lot of undissolved carbon that forms carbides after heating to 550 or 1100° C. This was confirmed by significant peaks for $Mn_3AlC$ in the XRPD (see also FIG. 9g). Further, the total peak area of 14.8 J/g indicates an amount of carbon dissolved in the τ phase of less 1.87%, and the material is not stable upon heat treatment. Interestingly, the material does not at all exhibit a DSC peak 1 in the temperature range of 780-810° C., but only a DSC peak 2 at higher temperatures.

Sample 2-B6 (($Mn_{53}Al_{47}$)$C_{1.50}$) contains carbon in an amount just sufficient to stabilize the τ phase, but the amount of Mn is too low to satisfy the requirements of formula (I). As explained previously and shown in FIGS. 10 a) and c), this sample has somewhat inhomogeneous composition and consequently upon a heat treatment a heterogeneous microstructure, which is shown to impair the magnetic properties.

Samples 2-B11 and 2-B12 have a high Mn/Al ratio, but lack sufficient carbon. These samples are not stable upon high temperature treatment and showed decomposition into β and γ2.

Sample 2-B5 also has an even higher Mn/Al ratio, and also sufficient carbon. Yet, this sample is at the limit where τ phase can at all be formed, potentially favoring the formation of β-phase, and impairing the purity of the τ-phase (and thereby magnetic properties).

The results above show that the desired balance of properties, including inter alia high purity of the ε phase and high stability and purity of the τ phase, stability of the material against high temperature processing, good magnetic properties, and improved homogeneity on a microscopic level, can be simultaneously obtained by adjusting the composition of the MnAl alloy within the boundaries of formula (I) and its preferred embodiments.

The results further show that the process steps of the method of the present invention, separately or in combination, allow improving the synthesis of MnAl alloys for magnetic applications, respectively the properties of the obtained material.

INDUSTRIAL APPLICABILITY

The present invention provides a novel method as well as a novel MnAl alloy suitable for magnetic applications and is thus industrially applicable.

EMBODIMENTS

1. An alloy represented by the formula (I)

$$(Mn_xAl_y)C_z \quad (I)$$

the alloy consisting of aluminum (Al), manganese (Mn), and carbon (C), and optionally unavoidable impurities;
wherein
x=56.0 to 59.0
y=41.0 to 44.0
x+y=100, and
z=1.5 to 2.4.

2. The alloy according to embodiment 1, wherein z=1.7 to 2.2, preferably 1.9 to 2.1

3. The alloy according to any one of embodiments 1 and 2, wherein the ratio of x to z (x/z), is in the range of 26 to 33, preferably 28 to 30.

4. The alloy according to any one of embodiments 1 to 3, wherein the ratio of x to z (x/z) is in the range of 26 to 30.

5. The alloy according to any one of embodiments 1 to 4, wherein x=56.5 to 58.5 and y=41.5 to 43.5, and wherein preferably x=57.0 to 58.0 and y=42.0 to 43.0.

6. The alloy according to any one of embodiments 1 to 5, which is by 90% by mass or more present as the ε phase.

7. The alloy according to any one of embodiments 1 to 6, which is in the form of particles, preferably in the form of particles as obtainable by a gas atomization process.

8. A method for producing or treating an alloy having a composition of formula (II)

$$(Mn_{x'}Al_{y'})C_{z'} \quad (II)$$

wherein
x'=52.0 to 59.0
y'=41.0 to 48.0
x'+y'=100, and
z'=0.1 to 3.0
the alloy consisting of Mn, Al, C, and optionally unavoidable impurities,
the process comprising one or more of the following steps:
a. providing the raw materials of the alloy, melting the raw materials, and forming particles of the alloy by gas atomization of the molten alloy;
b. performing a heat treatment on the alloy at 900-1200° C.;
c. milling the alloy represented by formula (II) at a temperature of −20° C. or below, preferably −100° C. or lower, further preferably −150° C. or lower; and/or
d. performing a heat treatment on particles of the alloy represented by formula (II) at a temperature of 900 to 1000° C. for a time of 0.5 to 20 minutes, preferably 5 to 15 minutes.

9. The method according to embodiment 8, wherein the alloy of formula (II) is an alloy of formula (I) as defined in any one of embodiments 1 to 6.

10. The method according to any one of embodiments 8 and 9, which comprises both the step c. of milling and the step d. of performing a heat treatment at 900-1000 C for 0.5-20 minutes, and wherein the milling c. is performed prior to the heat treatment d.

11. The method according to any one of embodiments 8 to 10 wherein only step d. is performed, or wherein only step b. is performed.

12. The method according to any one of embodiments 8 to 10, wherein all of steps a. to d. are performed, preferably in the order a., b., c., and d.

13. The method according to any one of embodiments 8 to 10, which includes steps a., c., and d., and optionally step b.; or which includes steps a., b., and d., and optionally step c.

14. An alloy obtainable by the method according to any one of embodiments 8 to 13.

15. An alloy according to embodiment 14 or according to any one of embodiments 1 to 7, which has a content of the τ phase of 80% or more, preferably 90% or more.

16. An alloy according to any one of embodiments 14, 15 or according to any one of embodiments 1 to 7, which has a saturation magnetization $M_S$ of 100 emu/g or more, preferably 110 emu/g or more, more preferably 117 emu/g or more, further preferably 120 emu/g or more.

17. An alloy according to embodiment 14, 15, 16 or according to any one of embodiments 1 to 7, which is in the form of particles having a median particle diameter D50, as determined by a light scattering method, of 5000 μm or less, more preferably 1000 μm or less, further preferably 500 μm or less, still further preferably 100 μm or less, such as in the range of 10 to 100 or 15 to 80 μm.

18. An alloy according to embodiment 14, 15 or 16 or according to any one of embodiments 1 to 7, which is in the form of particles having a median particle diameter D50, as determined by a light scattering method, of 200 μm or less, preferably 150 μm or less, and more preferably in the range of 30-80 μm.

19. An alloy according to embodiment 14, 15 or 16 or according to any one of embodiments 1 to 7, which is in the form of particles having a median particle diameter D50, as determined by a light scattering method, diameter of 100 μm or less, preferably 50 μm or less, more preferably 30 μm or less, further preferably 10μ or less, still further preferably 5 μm or less.

The invention claimed is:

1. A method for producing or treating an alloy having a composition of formula (II)

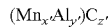  (II)

wherein
x'=52.0 to 59.0
y'=41.0 to 48.0
x'+y'=100, and
z'=0.1 to 3.0
wherein the ratio of x' to z' (x'/z') is in the range of 26 to 30,
the alloy consisting of Mn, Al, C, and optionally unavoidable impurities, the process comprising:
a. optionally, providing the raw materials of the alloy, melting the raw materials, and forming particles of the alloy by gas atomization of the molten alloy;
b. optionally, performing a heat treatment on the alloy at 900-1200° C.;
c. milling the alloy represented by formula (II) at a temperature of −20° C. or below-; and
d. performing a heat treatment on particles of the alloy represented by formula (II) at a temperature of 900 to 1000° C. for a time of 0.5 to 20 minutes,
wherein the milling c. is performed prior to the heat treatment d.

2. The method according to claim 1, wherein
x'=56.0 to 59.0
y'=41.0 to 448.0
x'+y'=100, and
z'=1.5 to 2.4.

3. The method according to claim 1, wherein z'=1.7 to 2.2.

4. The method according to claim 1, wherein x'=56.5 to 58.5 and y'=41.5 to 43.5.

5. The method according to claim 1, wherein x'=57.0 to 58.0 and y'=42.0 to 43.0.

6. The method according to claim 1, wherein the ratio of x' to z' (x'/z') is in the range of 27.5 to 30.

7. The method according to claim 1, wherein the alloy has a & phase content of 90% by mass or more.

8. The method according to claim 1, wherein all of steps a. to d. are performed.

9. The method according to claim 1, wherein step a. is performed.

10. The method according to claim 1, wherein step c. is performed at a temperature of −100° C. or lower.

11. The method according to claim 1, wherein step c. is performed at a temperature of −150° C. or lower.

12. The method according to claim 1, wherein step d. is performed for 5 to 15 minutes.

13. An alloy obtainable by the method according to claim 1.

14. The alloy according to claim 13, which has a content of the t phase of 80% or more.

15. The alloy according to claim 13, which has a saturation magnetization $M_S$ of 100 emu/g or more.

16. The alloy according to claim 13, which is in the form of particles having a median particle diameter D50, as determined by a light scattering method, of 5000 μm or less.

17. The alloy according to claim 13, which is in the form of particles having a median particle diameter D50, as determined by a light scattering method, of 200 μm or less.

18. The alloy according to claim 13, which is in the form of particles having a median particle diameter D50, as determined by a light scattering method, of 100 μm or less.

19. The alloy according to claim 13, wherein the alloy is in the form of particles.

20. The alloy according to claim 13, wherein the alloy has a saturation magnetization $M_S$ of 100 emu/g or more.

* * * * *